United States Patent
Kim et al.

(10) Patent No.: US 9,612,733 B2
(45) Date of Patent: Apr. 4, 2017

(54) DISPLAY APPARATUS AND METHOD CAPABLE OF PERFORMING A REMOTE CONTROLLING FUNCTION

(71) Applicant: LG ELECTRONICS INC., Seoul (KR)

(72) Inventors: Uniyoung Kim, Seoul (KR); Goeun Lee, Seoul (KR); Ryunghwa Rhee, Seoul (KR); Hyeran Jang, Seoul (KR); Kunsik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/543,934

(22) Filed: Nov. 18, 2014

(65) Prior Publication Data

US 2016/0004414 A1    Jan. 7, 2016

(30) Foreign Application Priority Data

Jul. 3, 2014  (KR) ........................ 10-2014-0083211

(51) Int. Cl.
*G06F 3/033* (2013.01)
*G06F 3/0484* (2013.01)
*H04N 21/422* (2011.01)
*H04N 21/431* (2011.01)
*H04N 21/472* (2011.01)
*H04N 21/475* (2011.01)
(Continued)

(52) U.S. Cl.
CPC .......... *G06F 3/04845* (2013.01); *G06F 3/017* (2013.01); *G06F 3/04842* (2013.01); *H04N 21/42204* (2013.01); *H04N 21/42221* (2013.01); *H04N 21/42222* (2013.01); *H04N 21/431* (2013.01); *H04N 21/472* (2013.01); *H04N 21/4755* (2013.01); *H04N 21/482* (2013.01)

(58) Field of Classification Search
CPC .. G06F 3/04845; G06F 3/017; G06F 3/04842; G06F 3/0485; H04N 21/42204; H04N 21/42221; H04N 21/42222; H04N 21/431; H04N 21/472; H04N 21/4755; H04N 21/482
See application file for complete search history.

(56) References Cited

U.S. PATENT DOCUMENTS

| | | | |
|---|---|---|---|
| 6,747,680 B1 * | 6/2004 | Igarashi | G06F 3/0485 345/159 |
| 8,373,805 B2 * | 2/2013 | Carlsgaard | H04N 5/4403 348/734 |

(Continued)

FOREIGN PATENT DOCUMENTS

EP    2296369 A2    3/2011

*Primary Examiner* — Peter D McLoone
(74) *Attorney, Agent, or Firm* — Birch, Stewart, Kolasch & Birch, LLP

(57) ABSTRACT

A display apparatus includes: a display unit configured to display a preset number of units divided from each other, such that some of a plurality of sequentially-arranged content is output; a remote controller configured to receive a control command for outputting others of the plurality of content; a wireless communication unit configured to receive a wireless signal corresponding to the control command; and a controller configured to control the display unit to decrease a size of each unit and to increase the number of units when the wireless signal is consecutively received.

20 Claims, 29 Drawing Sheets

(51) Int. Cl.
*H04N 21/482* (2011.01)
*G06F 3/01* (2006.01)

(56) References Cited

U.S. PATENT DOCUMENTS

| | | | | |
|---|---|---|---|---|
| 8,397,258 B2* | 3/2013 | Kim | ............... | H04N 5/44591 |
| | | | | 725/39 |
| 8,429,555 B2* | 4/2013 | Cho | ............... | G06F 3/0485 |
| | | | | 715/784 |
| 8,593,576 B2* | 11/2013 | Friedman | ......... | H04N 21/42204 |
| | | | | 340/12.28 |
| 8,681,111 B2* | 3/2014 | Kasahara | ............. | G06F 3/0488 |
| | | | | 345/173 |
| 8,760,400 B2* | 6/2014 | Kerr | ............... | G06F 3/0346 |
| | | | | 345/156 |
| 8,856,831 B2* | 10/2014 | Ahn | ............... | H04N 5/445 |
| | | | | 725/40 |
| 8,990,731 B2* | 3/2015 | Park | ............... | G06F 3/0485 |
| | | | | 715/730 |
| 9,082,350 B2* | 7/2015 | Shinohara | ............ | G09G 5/34 |
| 2008/0222558 A1* | 9/2008 | Cho | ............... | G06F 3/0485 |
| | | | | 715/784 |
| 2009/0322676 A1 | 12/2009 | Kerr et al. | | |
| 2010/0118211 A1 | 5/2010 | Carlsgaard et al. | | |
| 2010/0125874 A1* | 5/2010 | Ahn | ............... | H04N 5/445 |
| | | | | 725/41 |
| 2010/0171635 A1* | 7/2010 | Chu | ............... | G08C 17/02 |
| | | | | 340/12.22 |
| 2010/0186045 A1* | 7/2010 | Bae | ............... | H04N 5/45 |
| | | | | 725/56 |
| 2011/0047578 A1 | 2/2011 | Kim et al. | | |
| 2011/0090407 A1 | 4/2011 | Friedman | | |
| 2011/0122078 A1* | 5/2011 | Kasahara | ............. | G06F 3/0488 |
| | | | | 345/173 |
| 2012/0218310 A1* | 8/2012 | Shinohara | ............ | G09G 5/34 |
| | | | | 345/670 |
| 2013/0036386 A1* | 2/2013 | Park | ............... | G06F 3/0485 |
| | | | | 715/831 |
| 2013/0063344 A1 | 3/2013 | Obermüller et al. | | |
| 2014/0137032 A1* | 5/2014 | Won | ............... | G06F 3/0485 |
| | | | | 715/784 |
| 2016/0062584 A1* | 3/2016 | Cohen | ............ | G06F 3/0485 |
| | | | | 715/784 |

* cited by examiner

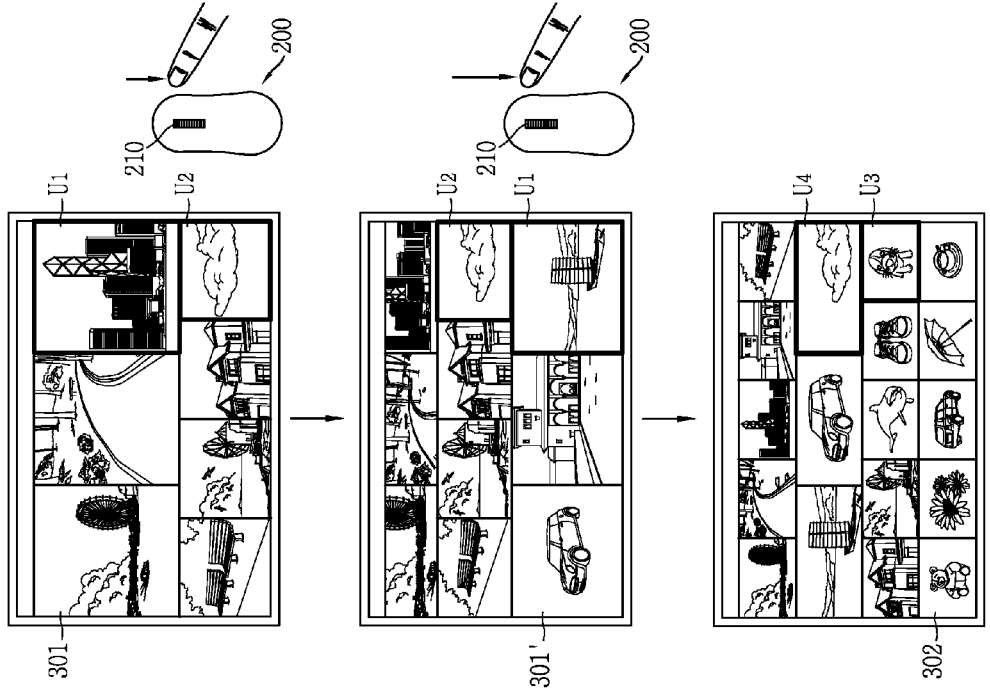
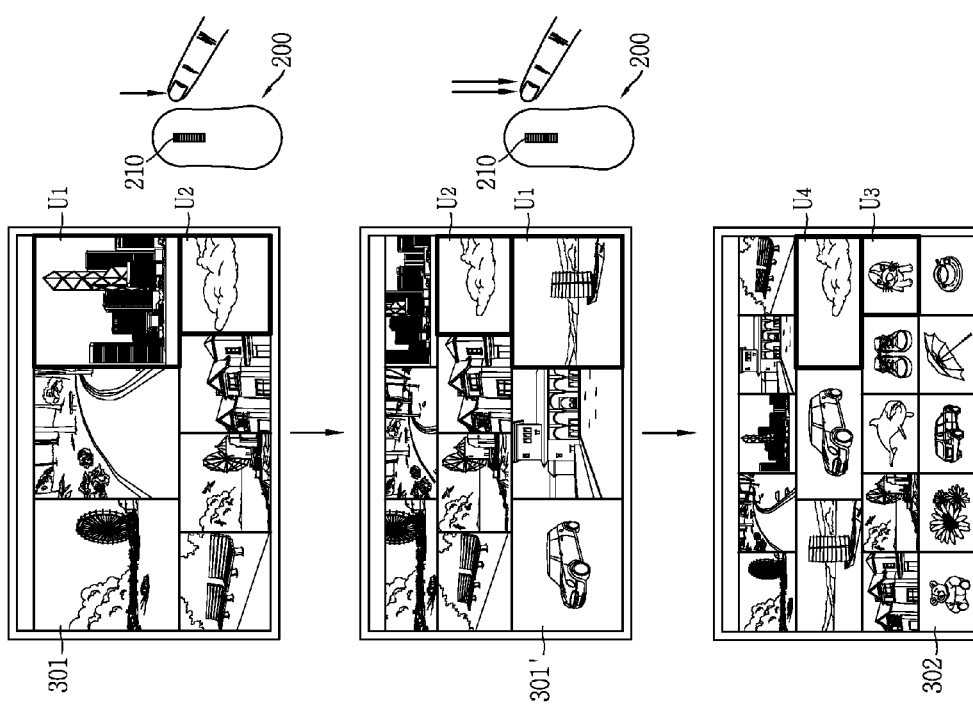

FIG. 13B

| ‹ SETTING ⚙ | |
|---|---|
| SCROLL CONTROL | |
| → CHANGE OF CONTENT LAYOUT | YES \| NO |
| → NUMBER OF TIMES OF SCROLLING | ✓ |
| → SCROLL DEGREE | ☐ |
| → LIMITED SIZE OF LAYOUT | 100 |
| → CLASSIFICATION OF CATEGORIES | DATE |

DISPLAY APPARATUS AND METHOD CAPABLE OF PERFORMING A REMOTE CONTROLLING FUNCTION

CROSS-REFERENCE TO RELATED APPLICATION

Pursuant to 35 U.S.C. §119(a), this application claims the benefit of earlier filing date and right of priority to Korean Application No. 10-2014-0083211, filed on Jul. 3, 2014, the contents of which is incorporated by reference herein in its entirety.

BACKGROUND OF THE DISCLOSURE

1. Field of the Disclosure

This specification relates to a display apparatus, and more particularly, to a display apparatus capable of performing a remote controlling function.

2. Background of the Disclosure

Display apparatuses include devices for receiving and displaying broadcast, devices for recording and reproducing moving images, and devices for recording and reproducing audio. The display apparatuses include a television, a computer monitor, a projector, a tablet, etc.

The display apparatus has multiple functions. In recent years, the display apparatus is implemented in the form of a multimedia player equipped with multiple functions including photographing, shooting of video, and gaming, in addition to basic functions of receiving broadcast and playing audio and video files. Furthermore, the display apparatus is implemented in the form of a smart device (e.g., smart television). Thus, the display apparatus not only executes the Internet, but also is interworked with a mobile terminal or a computer.

However, such multifunction of the display apparatus causes increase of booting time. For a user's enhanced convenience with respect to booting of the display apparatus, the display apparatus may be improved by structure and software.

Recently, as the amount of content provided by the display apparatus is increased, a user may be provided a large amount of information. However, in this case, the display apparatus should undergo a plurality of control steps for output of various content, such that desired content is searched among such large amount of content.

SUMMARY OF THE DISCLOSURE

Therefore, an aspect of the detailed description is to provide a display apparatus capable of outputting content so that a user can easily search and check his or her desired content.

To achieve these and other advantages and in accordance with the purpose of this specification, as embodied and broadly described herein, there is provided a display apparatus, including: a display unit configured to display a preset number of units divided from each other, such that some of a plurality of sequentially-arranged content is output; a remote controller configured to receive a control command for outputting others of the plurality of content; a wireless communication unit configured to receive a wireless signal corresponding to the control command; and a controller configured to control the display unit to decrease a size of each unit and to increase the number of units when the wireless signal is consecutively received.

In an embodiment, the remote controller may be provided with a sensor configured to sense a motion of the remote controller, and the controller may control the display unit such that the content is re-output to the preset number of units, based on a gesture command generated by the motion.

In an embodiment, the remote controller may include a wheel key formed to be rotatable, and the control command may be generated as the wheel key is rotated.

In an embodiment, in a case where the size of each unit has been reduced based on a control command to rotate the wheel key to a first direction, when wireless signals corresponding to a plurality of control commands to rotate the wheel key to a second direction opposite to the first direction, the controller may restore the size of each unit and the number of units.

In an embodiment, the controller may control the display unit to categorize the content into groups according to a preset first basis, based on the plurality of wireless signals, and to output at least one of the groups in a distinguished manner.

In an embodiment, in a case where the consecutive wireless signals are additionally received, the controller may control the display unit to re-categorize the content into groups according to a second basis different from the first basis, and to output at least one of the re-categorized groups in a distinguished manner.

In an embodiment, the first basis may be determined by information on the content, and may correspond to at least one of a stored date, a received date, a content type and a content genre.

In an embodiment, the remote controller may be provided with a sensor configured to sense a motion of the remote controller. When the content is categorized according to the first basis, the controller may re-categorize the content based on the motion according to a third basis corresponding to the first basis. When the content is categorized according to the second basis, the controller may re-categorize the content based on the motion according to a fourth basis corresponding to the second basis. When the second basis is lower than the first basis, the fourth basis may be lower than the third basis.

In an embodiment, in a case where the content is re-categorized according to the second basis, the controller may control the display unit to output the content by more reducing the size of each unit.

In an embodiment, when a wireless signal corresponding to the control command is applied from the remote controller while some of a plurality of groups are being output to the display unit, the controller may control the display unit to output the rest groups among the plurality of groups.

In an embodiment, when a wireless signal corresponding to the control command is applied from the remote controller, in a case where one of the plurality of groups has been selected, the controller may control the display unit to output the rest content included in the selected group.

In an embodiment, the remote controller may be provided with a sensor configured to sense a motion of the remote controller, and the controller may control the display unit to output the rest content included in each group based on the motion.

In an embodiment, when the wireless signals are consecutively received, the controller may extract recommended content from the plurality of content according to a preset basis, and may control the display unit to output the recommended content.

In an embodiment, the controller may output the recommended content to recommended units of a preset size, and a size of the recommended units may be larger than the size of the contracted units.

In an embodiment, the controller may control the display unit to output recommended information to the recommended units.

In an embodiment, the plurality of units may have different sizes.

In an embodiment, in a case where wireless signals are received a preset number of times within a preset reference time, the controller may change the size of each unit and the number of units.

To achieve these and other advantages and in accordance with the purpose of this specification, as embodied and broadly described herein, there is also provided a method of controlling a display apparatus, the method including: displaying some of a plurality of sequentially-arranged content, on a preset number of units divided from each other on a display unit; receiving a control command by a remote controller; receiving a wireless signal corresponding to the control command; when the wireless signal is consecutively received, reducing a size of each unit and increasing the number of the units; and displaying the plurality of content on the units.

In an embodiment, the method may further include extracting recommended content from the plurality of content, according to a preset basis, in a case where wireless signals are consecutively received.

In an embodiment, the method may further include categorizing the plurality of content according to a preset basis, in a case where wireless signals are consecutively received.

The present invention can have the following advantages.

Firstly, in a case where control commands for outputting the rest content are repeatedly applied, a size of each content is reduced so that a larger amount of content can be output at a time. Thus, a user can rapidly search for his or her desired information.

Secondly, since content is categorized according to a specific basis based on the repetitive control commands, or recommended content is provided according to a specific basis, a user can obtain his or her desired information in a more simple manner.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 13A(a) to 13B are conceptual views for explaining change of a control command by setting.

DETAILED DESCRIPTION OF THE DISCLOSURE

Figure 1:
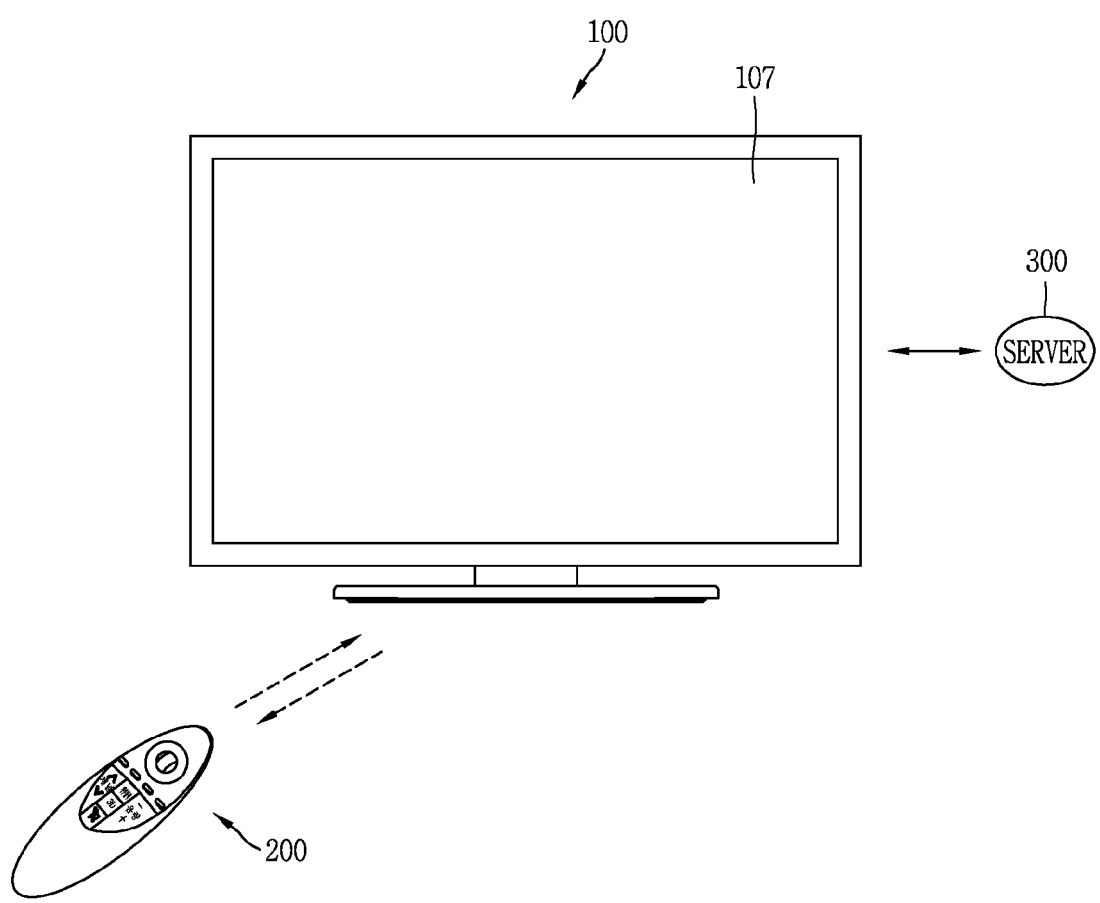
FIG. 1 is a conceptual view schematically illustrating a system including a display apparatus according to an embodiment of the present invention, a remote controller and a server.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes in addition to the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

FIG. 1 is a diagram schematically illustrating a system including a display apparatus 100 according to one embodiment of the present invention, a remote controller 200, a server 300. The remote controller 200 and the display apparatus 100 transmit and receive a wireless signal according to RF communication standards. A control menu is displayed on a display unit of the display apparatus 100 according to a control signal of the remote controller 200. The remote controller 200 includes multiple buttons, and generates an external input signal according to user's operation of the button. The server 300 is equivalent to a server that is provided in a broadcasting station or a server, a connection to which is established over the Internet. The display apparatus 100 receives a broadcast signal from the broadcasting station and outputs the received broadcast signal. In addition, the display apparatus 100 includes an apparatus that has access to the Internet using a Transmission Control Protocol/Internal Protocol.

Figure 2:
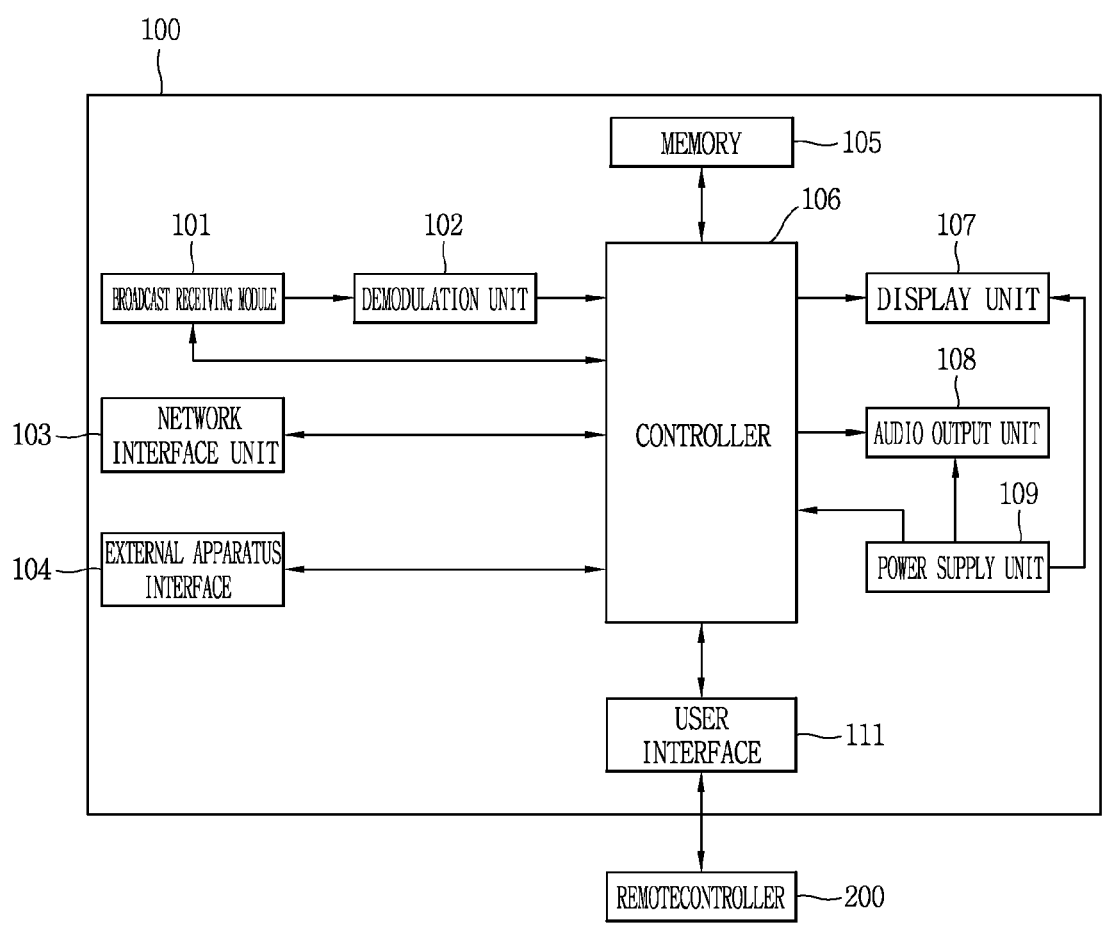
FIG. 2 is a block diagram illustrating components of a display apparatus according to an embodiment of the present invention, in more detail.

FIG. 2 is a block diagram illustrating in detail constituent elements of the display apparatus according to one embodiment of the present invention.

As illustrated in FIG. 2, the display apparatus 100 according to one embodiment of the present invention is configured to include a broadcast receiving module 101, a demodulation unit 102, a network interface 103, an external apparatus interface 104, a memory 105, a controller 106, a display unit 107, an audio output unit 108, a power supply unit 109, a wireless communication unit 110 and the like. On the other hand, the display apparatus 100 is designed in such a manner that the display apparatus 100 performs data communication with the remote controller 200. The remote controller 200 will be explained in more detail with reference to FIGS. 9(a) to 9(c).

The broadcast receiving module 101, for example, is designed as an RF tuner, or as an interface through which to receive broadcast data from an external device such as an STB. The broadcast receiving module 101, for example, receives an RF broadcast signal over a single carrier in accordance with Advanced Television System Committee (ATSC) standards or the RF broadcast signal over multiple carriers in accordance with Digital Video Broadcasting (DVB) standards.

The demodulation unit 102 receives a digital IF signal (DIF) that results from converting in the broadcast receiving module 101 and performs demodulation operation. For example, if the digital IF signal that is output from the broadcast receiving module 101 is of the ATSC type, the demodulation unit 102, for example, performs 8-Vestigial Side Band (8-VSB) demodulation. In addition, the demodulation unit 102 may perform channel decoding.

The external apparatus interface 104 is an interface that enables the data communication between an external apparatus and the display apparatus 100. The external apparatus interface 104 is connected, in a wire or wireless manner, to the external apparatus, such as a digital versatile disk (DVD) player, a Blu-ray disk player, a game apparatus, a camera, a camcorder, or a personal computer (notebook computer) or an STB. The external apparatus interface 104 transfers to the controller 106 an image, audio or data signal that is input externally through the connected external apparatus. In addition, the image, the voice, or the data signal that is processed in the controller 106 is output to the external apparatus.

The external apparatus interface 104, for example, includes a USB port, a Composite Video Banking Sync (CVBS) port, a composite port, an S-video port (analog), a Digital Visual Interface (DVI) port, a High Definition Multimedia Interface (HDMI) port, a RGB port, a D-SUB port, and the like. A network interface 103 provides an interface for connecting the electronic device 100 to a wire/wireless network, such as the Internet. The network interface 103 includes, for example, an Ethernet port for the connection to the wire network. For the connection to the wireless network, telecommunication standards are used such as Wireless LAN (WLAN) (Wi-Fi), Wireless broadband (Wibro), World Interoperability for Microwave Access (Wimax), and High Speed Downlink Packet Access (HSDPA).

The network interface 103 transmits or receives data to and from a different user or a different display apparatus over a connected network, or over a different network linked to the connected network.

A program for signal processing and control within the controller 106, and the image or the audio or data signal that is signal-processed may be stored in the memory 105. In addition, the image, the audio, or the data signal that is input from the external apparatus interface 104 or the network interface 103 may be temporarily stored in the memory 105.

In addition, various operating systems (OS), middleware, and platforms are stored in the memory 105.

A signal that is input by the user is transferred to the controller 106 through the wireless communication unit 110, or a signal is transmitted from the controller 106 to an external device (for example, the remote controller 200) through the wireless communication unit 110. For example, the wireless communication unit 110 is designed in such a manner that in accordance with various communication standards such as Radio Frequency (RF) communication standards, and IR communication standards, the wireless communication unit 110 receives from the remote controller 200 control signals for power on/off, channel selection, screen setting, and the like and processes the control signals, or transmits a control signal from the controller 106 to the remote controller 200.

Through the broadcast receiving module 101, the demodulation unit 102, and the network interface 103 or the external apparatus interface 104, the controller 106 demultiplexes a stream being input or processes demultiplexed signals to generate and output signals for outputting the image and the audio. The controller 106 is described below in detail referring to the accompanying drawings.

An image signal, a data signal, and an OSD signal that are processed in the controller 106 or an image signal and a data signal that are received through the external apparatus interface 104 are converted into signals for driving RGB light sources for display of colors on the display unit 107.

A PDP display, an LCD display, and an OLED display are available for the display unit 107. The display unit 107 can be in the form of a flexible display or can realize a 3D display.

A signal, such as a stereo signal, a 3.1 channel signal, or a 5.1 channel signal, that is audio-processed in the controller 106, is input into the audio output unit 108 to be output as the audio. The audio output unit 108 is realized as various types of speakers. Then, the power supply unit 109 supplies electric power to the entire display apparatus 100. Particularly, the electric power is supplied to the controller unit 180 that can be realized in the form of a system-on-chip (SOC), the display unit 107 for the display of the image, and the audio output unit 108 for the output of the audio.

Specifically, according to the embodiment of the present invention, descriptions are provided as follows. Under the control of the controller 106, the network interface 103 has access to a specific server. Furthermore, IR code values received from the specific server are designed to be stored in the memory 105. On the other hand, the IR code values are values necessary for controlling an electric device, the connection to which is established through the external apparatus interface 104.

Last, at the request of the remote controller 200, the IR code value corresponding to a specific function of a specific electronic device is transmitted to the remote controller 200 through the wireless communication unit 110. As described above, at this point, a type of communication in accordance with Bluetooth standards is employed.

Figure 3A:
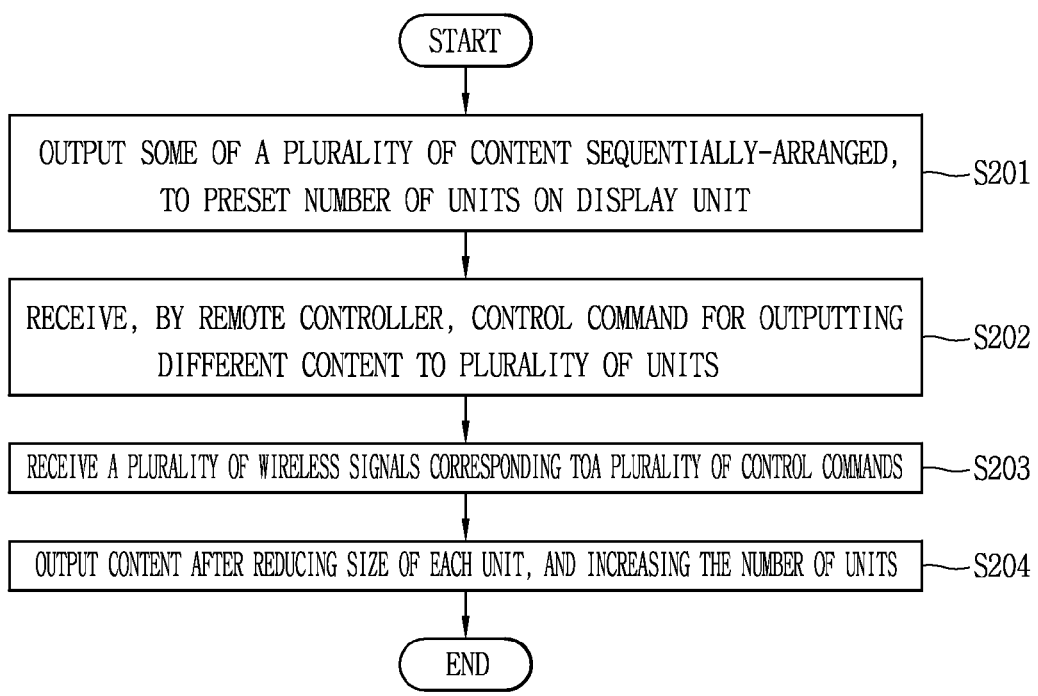
FIG. 3A is a flowchart for explaining a method of controlling a display apparatus according to an embodiment of the present invention.
Figure 3B:
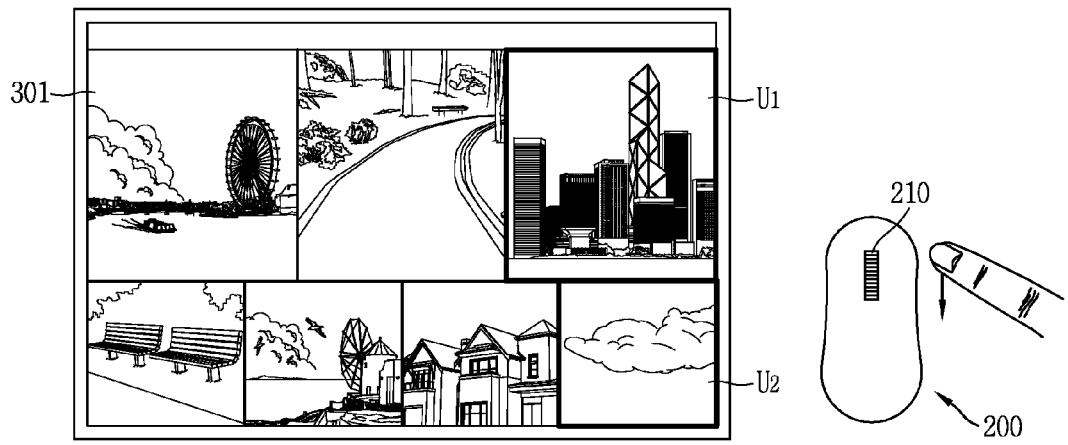
FIGS. 3B(a) to 3E(b) are conceptual views for explaining the control method of FIG. 3A, according to another embodiments.
Figure 3B:
Figure 3B:
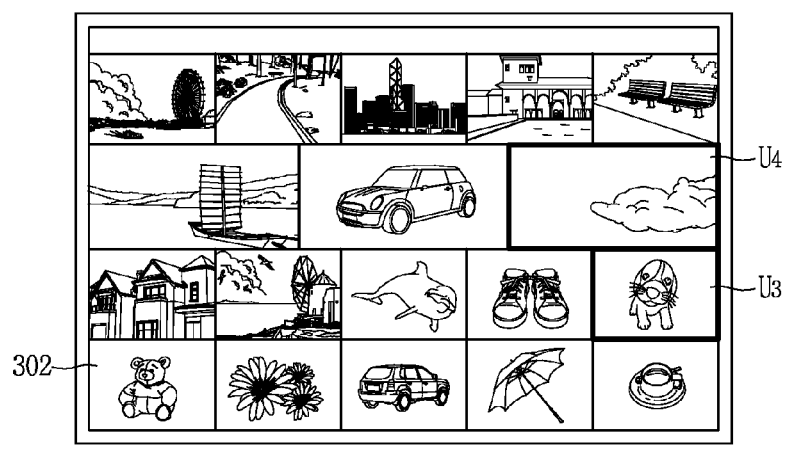

FIG. 3A is a flowchart for explaining a method of controlling a display apparatus according to an embodiment of the present invention, and FIGS. 3B(a) to 3E(b) are conceptual views for explaining the control method of FIG. 3A according to another embodiments.

Referring to FIG. 3A, FIGS. 3B(a) 3B(c), the display unit 107 outputs some of a plurality of content sequentially disposed, on a preset number of units, respectively (S201). For instance, the content may be arranged in order of received (stored) date (time), in order of title provided to content, according to a type of each content, etc. However, the present invention is not limited to this. Only some of the plurality of content sequentially disposed may be output to the display unit 107.

The display unit 107 is composed of a plurality of units divided from each other so as to display the plurality of content. For instance, the display unit 107 may be composed of one or more first units (U1) and one or more second units (U2). The first units (U1) and the second units (U2) may have different sizes. In the drawings, the display unit 107 is composed of the first units (U1) and the second units (U2). However, the present invention is not limited to this. That is, the display unit 107 may be composed of a single unit, or at least three different units. That is, the display unit 107 is composed of units of the same size or different sizes.

A single content is output to a single unit. That is, the content is output by being enlarged or contracted in accordance with a size of the unit. That is, the display unit 107 outputs initial screen information 301.

The remote controller 200 receives a control command for outputting different content to the plurality of units (S202). The remote controller 200 receives a control command for controlling the display unit 107. The remote controller may include at least one input module, as a user input unit. The input module may be implemented as a touch key, a push key (mechanical key), etc. Alternatively, the input module may be provided with a microphone for recognizing a user's voice, etc. For instance, the user input unit may be implemented as a wheel key 210 formed to be rotatable up and down and configured to perform a scroll input by a user.

The controller 106 may control the display unit 107, based on a control command applied to the wheel key 210, such that content displayed on the plurality of units is changed. For instance, in a case where a scroll input is downward applied by the wheel key 210, the controller 106 may sequentially output content arranged after currently-output content among sequentially-arranged content. In this case, content to be output to the display unit 107 may be determined based on an application degree of the scroll input.

Referring to FIGS. 3B(a) and (b), the display unit 107 displays different content on the first and second units (U1 and U2). In this case, some units including initially-output content may be output to the display unit 107, based on an application degree of a scroll input.

Once a control command is applied to the remote controller 200, the remote controller 200 receives a wireless signal based on the control command. The controller 106 may control the display unit 107 based on the received wireless signal. A user may apply a control command to the remote controller 200, thereby outputting, to the display unit 107, additional screen information 301' including a plurality of new content displayed on units.

The wireless communication unit 110 receives a plurality wireless signals corresponding to control commands applied to the remote controller 200 (S203). The wheel key 210 of the remote controller 200 may consecutively receive a user's control commands a plurality of times. For instance, the controller 106 may determine that control commands have been consecutively applied based on a rotation frequency of the wheel key 210 for a preset time (the number of times that the wheel key 210 has rotated), a rotation range of the wheel key for a preset time, etc.

If a user rapidly rotates the wheel key 210 a plurality of times, the wheel key may be rotated a plurality of times for a preset time. In this case, the remote controller 200 consecutively transmits a plurality of wireless signals, according to the plural rotations of the wheel key. If a user applies a great force to the wheel key 210 for a large rotation degree of the wheel key 210, the wheel key 210 may rotate with a large angle. In a case where a reference rotation angle of the wheel key is set as a control command, the remote controller 200 may determine that a plurality of control commands have been applied by driving a total rotation angle of the wheel key 210 by a reference rotation angle. In this case, too, the remote controller 200 may transmit a plurality of wireless signals.

In case of consecutively receiving the plurality of wireless signals, the controller 106 controls the display unit 107 to output content by reducing a size of each unit, and by increasing the number of units which are on the display unit 107 (S204). The controller 106 controls the display unit 107 to output modified screen information 302 composed of a plurality of content displayed on third and fourth units (U3 and U4).

Referring to FIGS. 3B(a) to 3B(c), the controller 106 generates the third and fourth units (U3 and U4) in a smaller size than the first and second units (U1 and U2). The number of the third and fourth units (U3 and U4) is larger than the number of the first and second units (U1 and U2). The display unit 107 outputs different content to the third and fourth units (U3 and U4). That is, the display unit 107 outputs a larger number content in a smaller size.

The third and fourth units (U3 and U4) may have different sizes. However, the third and fourth units (U3 and U4) may be irregularly arranged. Alternatively, the display unit 107 may be composed of the same type of units having a smaller size than the first and second units (U1 and U2).

Content displayed on the third and fourth units (U3 and U4) may be partially or wholly overlapped with content displayed on the first and second units (U1 and U2). However, the present invention is not limited to this. That is, the controller 106 may control content displayed on each unit to be changed whenever a size of each unit and the number of units are changed.

In the present invention, control commands for outputting new content are consecutively applied to the remote controller 200, the number of content output to the display unit 107 is increased. That is, if the control commands are applied to the remote controller 200 a plurality of times, it is determined that a user's desired content has not been provided. As a result, the controller 106 increases the number of units which provide various types of content, such that a large number of content is provided at one time. Thus, a user can be provided with a larger number of content at one time.

Although not shown, in a case where the control commands are consecutively re-applied a plurality of times in a state of FIG. 3B(b), the controller 106 may provide a plurality of content by dividing the display units 107 in a smaller size than the third and fourth units (U3 and U4).

In a case where the control commands are consecutively applied to the remote controller 200 in a state of FIG. 3B(b), the controller 106 may control the display unit 107 to output new content on the third and fourth units (U3 and U4). That is, if a wireless signal corresponding to the control command is received, the rest content among a plurality of sequentially-arranged content may be output to the third and fourth units (U3 and U4).

Hereinafter, a method of restoring a size of a unit and the number of units will be explained with reference to FIGS. 3C(a) to 3C(b). The remote controller 200 according to an embodiment further includes a sensor (not shown) configured to sense a motion. For instance, the sensor may be implemented as a gyro sensor, an acceleration sensor, etc. The remote controller 200 may transmit its motion sensed by the sensor (not shown), as a wireless signal.

Figure 3C:
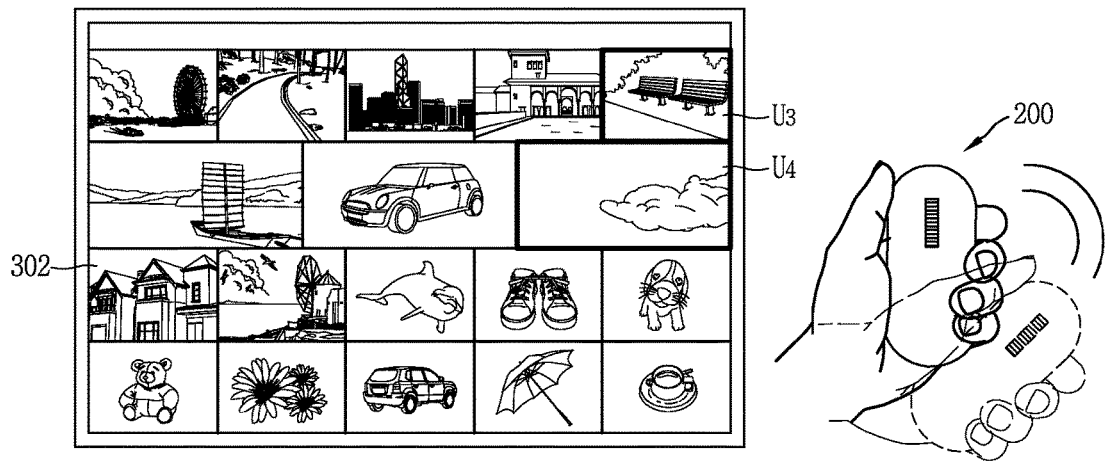
Figure 3C:
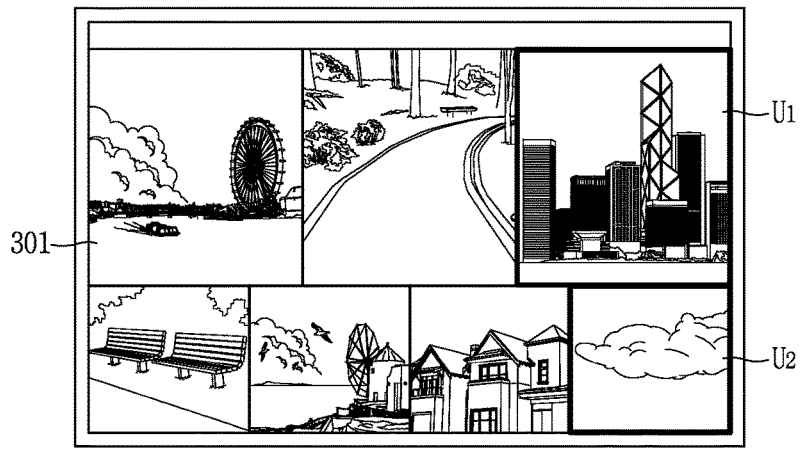

FIG. 3C(a) illustrates the display unit 107 which displays content to the third and fourth units (U3 and U4). The display unit 107 outputs the modified screen information 302 composed of the third and fourth units (U3 and U4). The controller 106 receives a wireless signal generated based on a motion of the remote controller 200, in an activated state of the display unit 107.

The controller 106 controls the display unit 107 to convert the modified screen information 302 into the initial screen information 301, based on the wireless signal generated by a motion of the remote controller 200. The initial screen information 301 may be initial screen information composed of the first and second units (U1 and U2).

The initial screen information may be screen information firstly output when a specific program is executed in order to output the content, the screen information including a plurality of content. However, the present invention is not limited to this. The controller 106 may control the display unit 107 to output screen information of a previous step, based on a wireless signal by a motion of the remote controller 200 in case of performing a step of gradually reducing the size of each unit.

For instance, if it is sensed that a direction of the remote controller 200 is changed a plurality of times, the controller 106 may control the display unit 107 to output the initial screen information. On the contrary, if it is sensed that the direction of the remote controller 200 is changed toward a specific direction one time, the controller 106 may control the display unit 107 to output previous screen information.

That is, a user may apply a control command to the remote controller 200 while receiving a large number of content having a reduced size, thereby increasing the size of each unit.

Figure 3D:
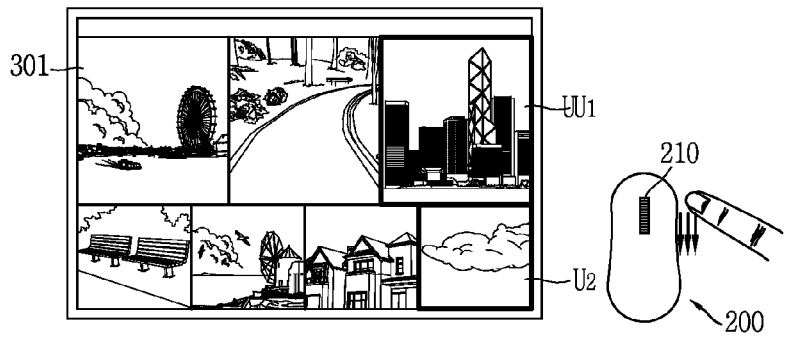
Figure 3D:
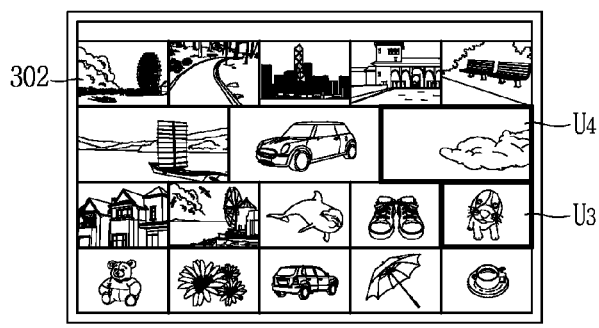
Figure 3D:
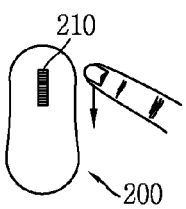
Figure 3D:
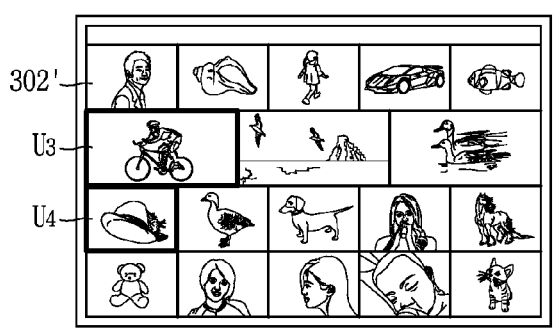
Figure 3D:
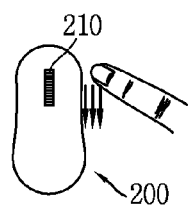
Figure 3D:
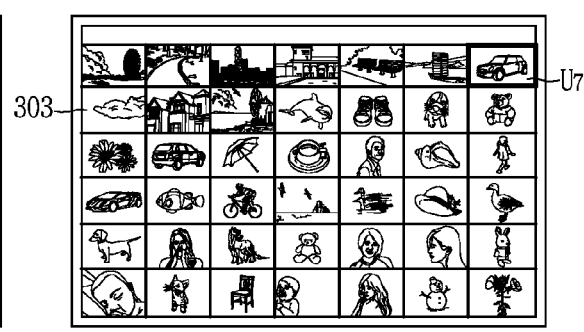

FIGS. 3D(a) to 3D(d) are conceptual views for explaining a control method based on a control command received from the remote controller 200. FIG. 3D(a) illustrates the display unit 107 which outputs the initial screen information 301 for outputting a plurality of content on the first and second units (U1 and U2).

Upon reception of a plurality of wireless signals corresponding to a plurality of control commands applied to the remote controller 200, the controller 160 controls the display unit 107 to output the modified screen information 302 composed of a plurality of content displayed on the third and fourth units (U3 and U4).

Referring to FIGS. 3D(b) and 3D(c), when a single wireless signal corresponding to a control command is transmitted, the controller 160 controls the display unit 107 to output additional screen information 302' composed of the third and fourth units (U3 and U4) and displaying different content.

Referring to FIGS. 3D(b) and 3D(d), when wireless signals corresponding to a plurality of control commands are consecutively transmitted, the controller 106 may control the display unit 107 to output modified screen information 302 including a plurality of content displayed on seventh units (U7). The seventh units (U7) are formed to have a smaller size than the first to fourth units (U1, U2, U3 and U4), and the number of the seventh units (U7) on the display unit 107 is larger than the number of units included in the initial screen information 301 and the modified screen information 302.

That is, in a state where screen information composed of a plurality of units has been output, the controller 106 may distinguish a case where wireless signals are consecutively transmitted, from a case where a wireless signal is transmitted one time, thereby maintaining or changing the size of each unit and the number of units. The plurality of wireless signals may be formed when a user repeatedly rotates the wheel key 210, or when a user rapidly rotates the wheel key 210 at a time.

Figure 3E:
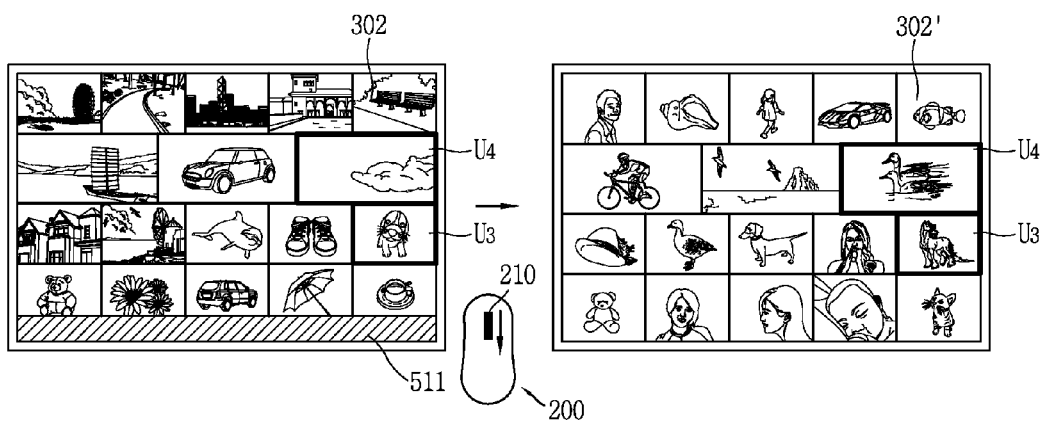
Figure 3E:
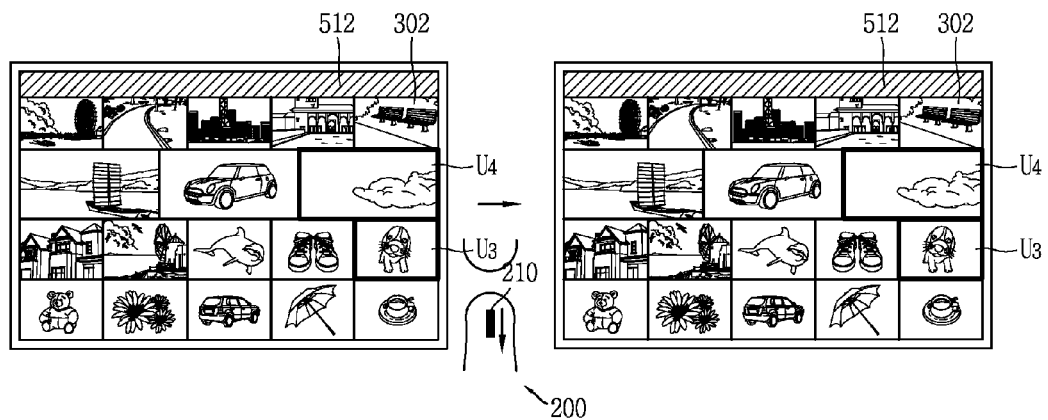

FIGS. 3E(a) and 3E(b) are conceptual views for explaining a control method to output an indicator for checking whether there is additional content or not.

Referring to FIG. 3E(a), the display unit 107 outputs screen information composed of the third and fourth units (U3 and U4). However, the screen information according to this embodiment needs not be composed of the third and fourth units (U3 and U4), and corresponds to screen information composed of a plurality of units.

If there exists content of which output is restricted because it is arranged behind currently-displayed content, the controller 106 controls the display unit 107 to output a first indicator 511. Preferably, the first indicator 511 is output to a region adjacent to a lower part of the display unit 107. That is, the first indicator 511 indicates that there exists content outputtable by a control command generated by downward rotating the wheel key 210 by a user. Output of the first indicator 511 is restricted when there is no additional content which is in a standby state for output.

Referring to FIG. 3E(b), the display unit 107 outputs a second indicator 512 to a region adjacent to an upper part of the display unit 107. The second indicator 512 indicates that there exists content outputtable by a control command generated by upward rotating the wheel key 210. Upon reception of a wireless signal corresponding to a control command generated by downward rotating the wheel key 210, the controller 160 outputs the screen information. In the case where the wireless signal has been received, the controller 160 may control the display unit 107 to highlight the second indicator 512, so as to induce a user's upward control command.

Thus, a user can easily determine whether there exists additional content or not in case of being provided with a plurality of content at a time, and can select whether to be provided with a larger number of content at a time or not.

Figure 4A:
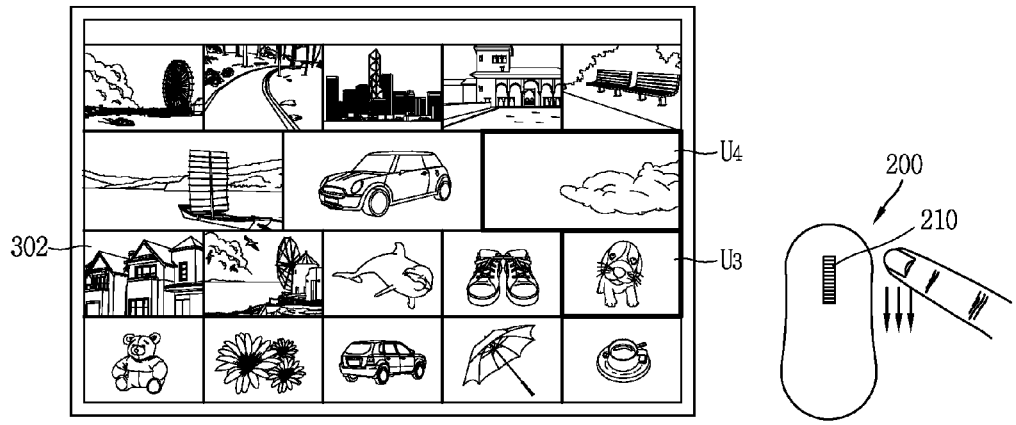
FIGS. 4A(a) to 4C(b) are conceptual views for explaining a control method to output content by categorization based on a control command.
Figure 4A:
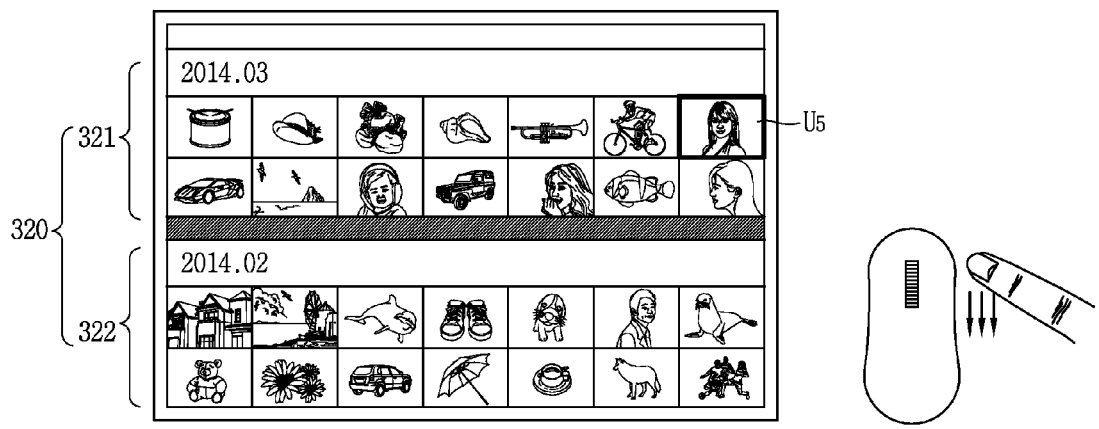
Figure 4A:
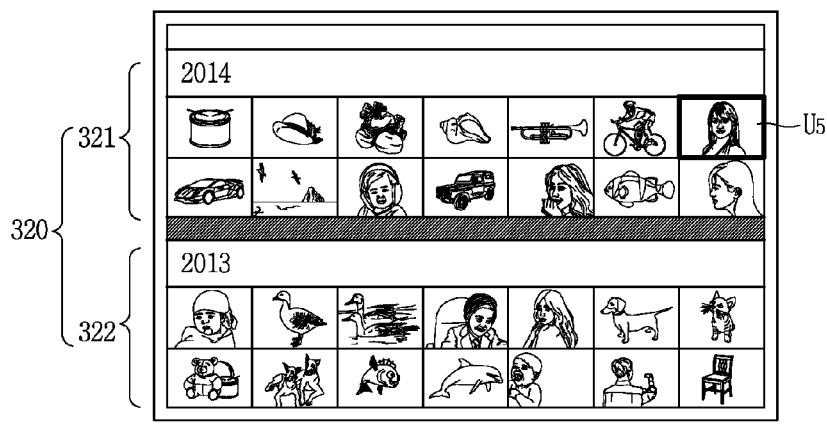

FIGS. 4A(a) to 4C(b) are conceptual views for explaining a control method to output content by categorization based on a control command.

Referring to FIGS. 4A(a) to 4A(c), a control method to output content by categorizing the content according to an embodiment will be explained. FIG. 4A(a) illustrates the display unit 107 which outputs the modified screen information 302 where content has been displayed on the third and fourth units (U3 and U4). The controller 106 categorizes the content based on consecutive wireless signals, while the modified screen information 302 is being output.

The controller 106 controls categorization of the content, in a case where wireless signals are consecutively received a preset number of times, or in a case where consecutive wireless signals are received in a state where units of a preset size have been formed.

For instance, the controller 106 categorizes content included in a memory or received from the server, based on information included in the content according to a preset basis. For instance, the preset basis may be defined based on a program activated to output content. For instance, the preset basis may be date information included in content, a genre of a media file when content is a media file, a data source from which content has been provided, etc.

Referring to FIG. 4A(b), the controller 106 controls the display unit 107 to output content by categorizing according to month. If the content is categorized, the controller 106 controls the display unit 107 to have one region thereof as fifth units (U5), and controls the categorized content to be displayed on the fifth units (U5). The fifth units (U5) may be formed to be smaller than the third and fourth units (U3 and U4).

The display unit 107 outputs first screen information 310 composed of a first group 311 including content displayed on a plurality of fifth units (U5), and a second group 312 including content displayed on a plurality of fifth units (U5). The first group 311 and the second group 312 are displayed so as to be distinguished from each other.

As shown in FIG. 4A(b), the first group 311 and the second group 312 are displayed so as to be distinguished from each other, and the display unit 107 outputs information (2014. 03) of the first group 311, and information (2014. 02) of the second group 312.

Referring to FIG. 4A(c), if a plurality of consecutive wireless signals are received from the remote controller 200 in a state where the first screen information 310 has been output, the controller 106 controls the display unit 107 to output second screen information 320. The second screen information 320 includes a third group 321 and a fourth group 322. The third group 321 and the fourth group 322 include a plurality of content displayed on the fifth units (U5). For instance, the third and fourth groups 321 and 322 categorize the content according to a higher basis than the first and second groups 311 and 312. The third and fourth groups 321 and 322 correspond to groups divided from each other according to year. Content included in the first and second groups 311 and 312 may be included in the third group 321. The third group 321 is output together with its information 2014, and the fourth group 322 is output together with its information 2013.

That is, the controller 106 outputs a plurality of content by re-categorizing according to a higher basis or a lower basis based on a plurality of wireless signals. In this case, a size of each unit for outputting the plurality of content may be substantially the same.

Although not shown, if a control command is applied to the wheel key 210 in an opposite rotation direction to the aforementioned direction, the content may be categorized according to a lower basis. For instance, if a control command to upward rotate the wheel key 210 is applied, the controller 106 may control the display unit 107 to output the content by categorizing the content according to main unit.

If a single control command is applied, the controller 106 controls the display unit 107 to output the rest content categorized according to another year.

Thus, a user can be provided with content included in the display apparatus by categorization, by applying a plurality of control commands to the remote controller.

Figure 4B:
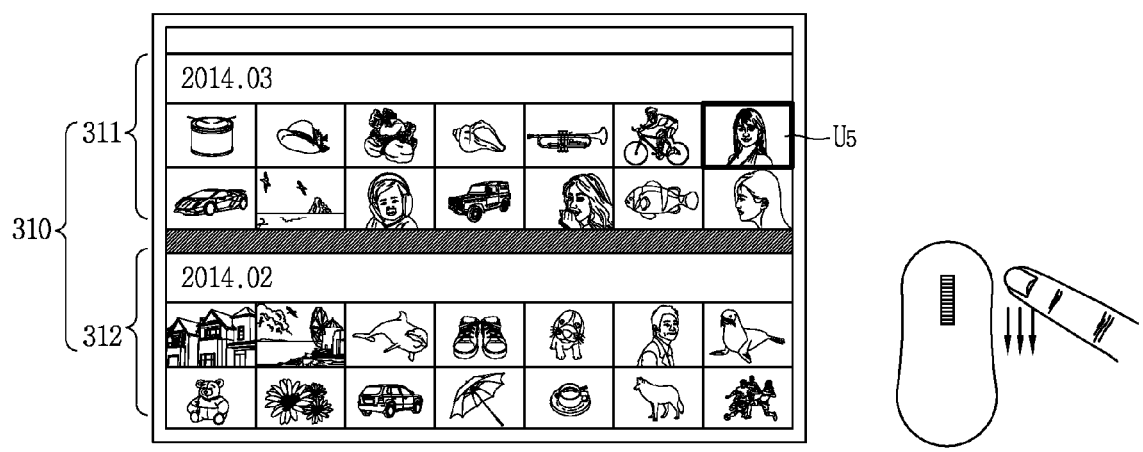
Figure 4B:
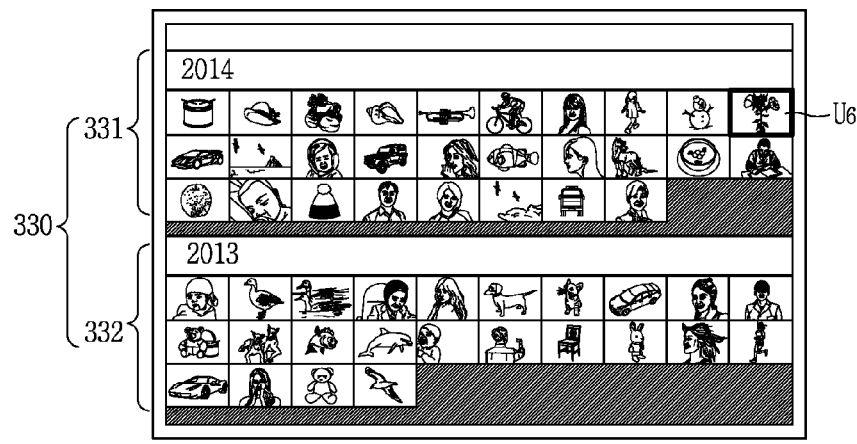

A control method to output content by changing a size of the content by categorization will be explained with reference to FIGS. 4B(a) and 4B(b). The controller 106 receives a plurality of wireless signals from the remote controller 200, in a state where the first screen information 310 is composed of the first and second groups 311 and 312. The first and second groups 311 and 312 include a plurality of content displayed on the fifth units (U5). The controller 106 controls the display unit 107 to output third screen information 330 composed of the third and fourth groups 321 and 322, based on the plurality of wireless signals.

The third and fourth groups 321 and 322 include a plurality of content displayed on a plurality of sixth units (U6). The sixth units (U6) are formed to have a larger or smaller size than the fifth units (U5). Referring to FIG. 4B(b), the sixth units (U6) are formed to have a smaller size than the fifth units (U5), and each of the third and fourth groups 321 and 322 outputs a larger number of content than the first and second groups 311 and 312.

That is, in a case where the content is categorized according to a higher basis, smaller units may be formed to output a larger amount of content.

Figure 4C:
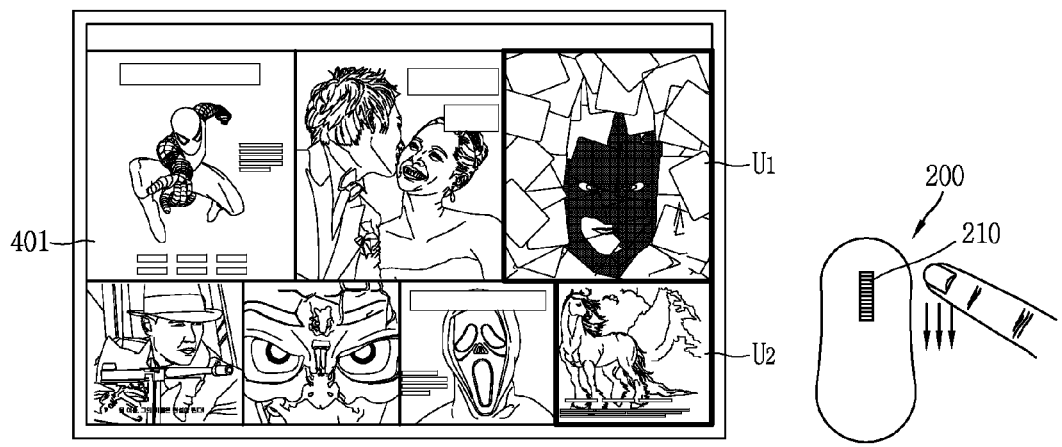
Figure 4C:
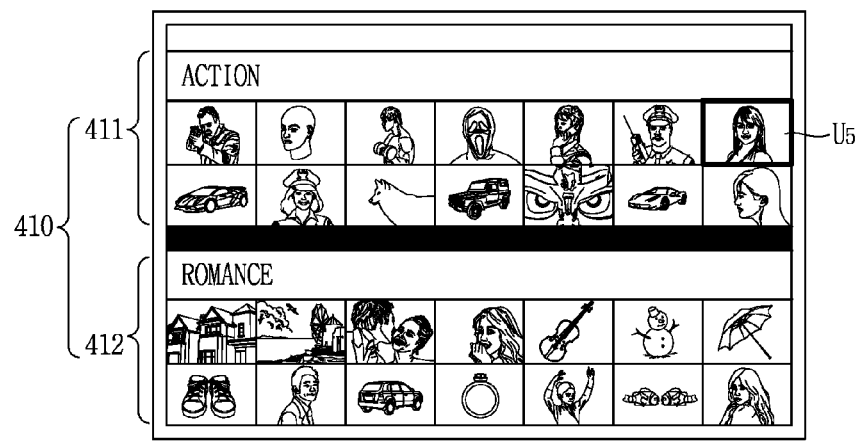

FIGS. 4C(a) and 4C(b) is a conceptual view for explaining a control method to categorize content according to another embodiment. FIG. 4C(a) is a conceptual view illustrating the display unit 107 which displays content displayed on the first and second units (U1 and U2). In this embodiment, the content may correspond to media-related images. For instance, the contents may correspond to a movie poster. The display unit 107 outputs first screen information 401 composed of the first and second units (U1 and U2).

In a case where a plurality of wireless signals corresponding to control commands applied to the remote controller 200 are consecutively received, the controller 106 controls the display unit 107 to output the content by categorization. For instance, the controller 106 may categorize images based on a genre of media. The display unit 107 outputs second screen information 410 including a first genre (ACTION 411) and a second genre (ROMANCE 412). A plurality of content included in the first and second genres 411 and 412 may be displayed on the fifth units (U5). The fifth units (U5) are formed to have a smaller size than the first and second units (U1 and U2), and output a larger number of content than the first and second units (U1 and U2).

That is, since the controller 106 categorizes the content based on information commonly included in the content, a user can be provided with content which has been categorized according to a proper basis, without setting an additional basis for categorizing the content.

Figure 5A:
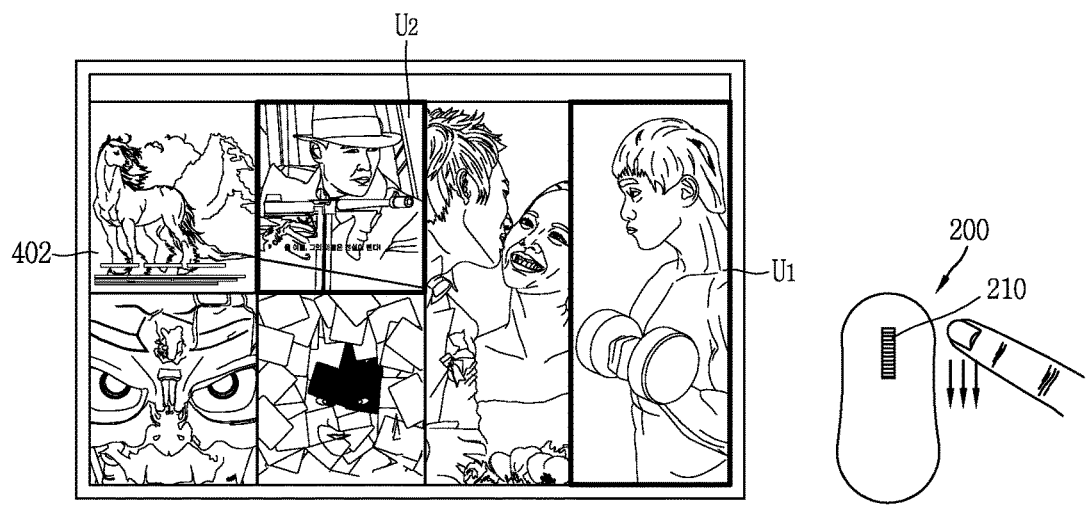
FIGS. 5A(a) to 5C(c) are conceptual views for explaining a control method to extract and provide recommended content.
Figure 5A:
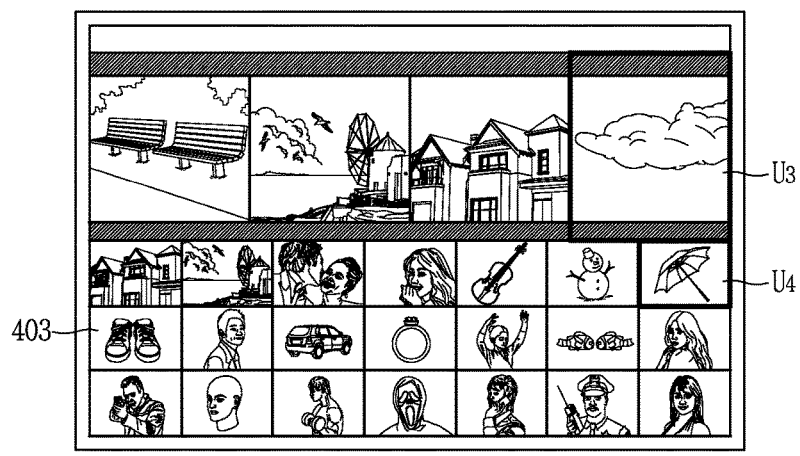

FIGS. 5A(a) to 5C(c) are conceptual views for explaining a control method to extract and provide recommended content.

Referring to FIG. 5A(a), the display unit 107 outputs first screen information 402 including a plurality of content displayed on the first and second units (U1 and U2). The first and second units (U1 and U2) may have different sizes. However, the first screen information 402 may be composed of units of the same size.

When a plurality of wireless signals corresponding to control commands applied to the wheel key 210 of the remote controller 200 are consecutively received, the controller 106 extracts recommended content from the plurality of content. The controller 106 may extract at least one recommended content, from all content stored in the memory, according to a preset basis. The preset basis may be determined by analyzing a user's control pattern. For instance, the preset basis is determined by a genre of content frequently played by a user, a time when a user is provided with content, a type of content additionally stored by a user, etc. The recommended content may have no relation to each other.

Once the recommended content is extracted, the controller 106 controls the display unit 107 to output third screen information 403 including the recommended content. The third screen information 403 may be composed of the third and fourth units (U3 and U4). The recommended content may be displayed on the third units (U3), and the rest content may be displayed on the fourth units (U4). In this case, the third units (U3) (recommended units), where the recommended content is displayed, are formed to have a larger size than the fourth units (U4). In the drawings, the third units (U3) are disposed above the fourth units (U4). However, the arrangement structure of the units is not limited to this.

That is, the controller 106 may control recommended content to be displayed on large-sized units, and the rest content to be displayed on small-sized units, so that a user can recognize the recommended content more rapidly. The user applies control commands a plurality of times when he or she has a difficulty in searching for desired content. In this case, the controller 106 may provide content considered as content desired by the user, through an analysis.

Figure 5B:
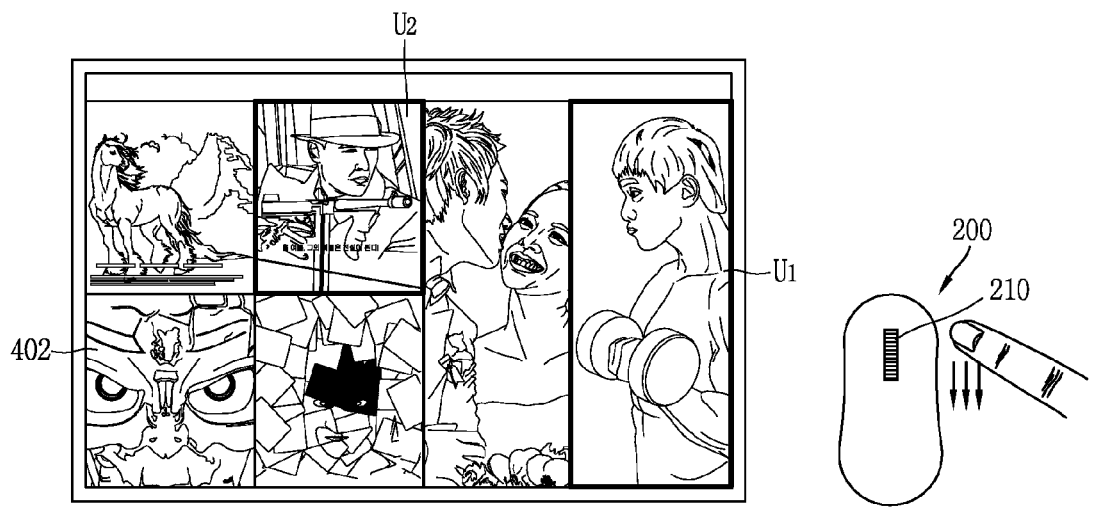
Figure 5B:
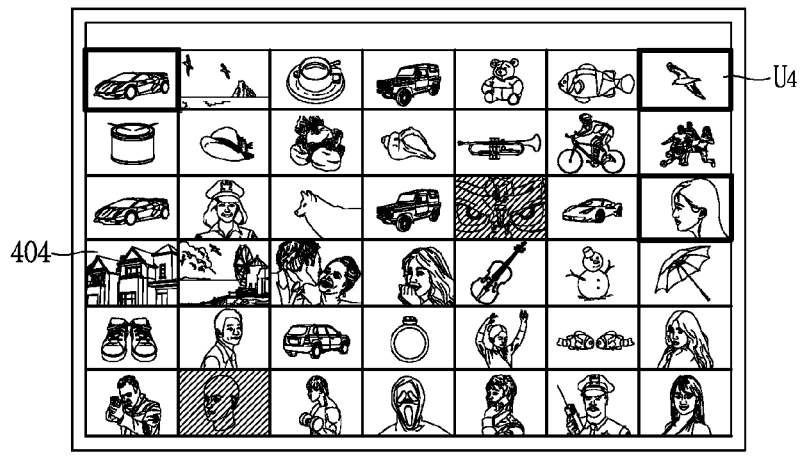

A control method according to another embodiment will be explained with reference to FIGS. 5B(a) and 5B(b). While the first screen information 402 composed of the first and second units (U1 and U2) is being output to the display unit 107, if wireless signals corresponding to a plurality of control commands are consecutively received, the controller 106 extracts the recommended content.

The controller 106 controls the display unit 107 to output fourth screen information 404 composed of a plurality of fourth units (U4), based on the consecutive wireless signals. The fourth units (U4) have a smaller size than the first and second units (U1 and U2), and have a larger number than the first and second units (U1 and U2). That is, a user can be provided with a larger number of content at a time.

The controller 106 controls the display unit 107 to output preset visual information to the recommended content, among a plurality of content displayed on the fourth units (U4). For instance, the controller 106 controls the display unit 107, such that a brightness of the fourth units (U4) where the recommended content is displayed is controlled, specific images are output to the fourth units (U4), or a highlight effect is provided to the fourth units (U4).

Figure 5C:
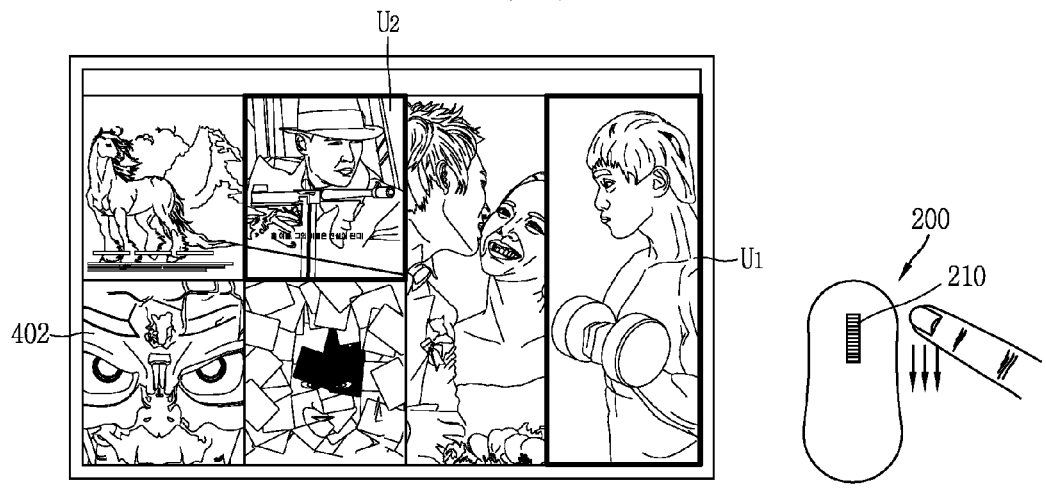
Figure 5C:
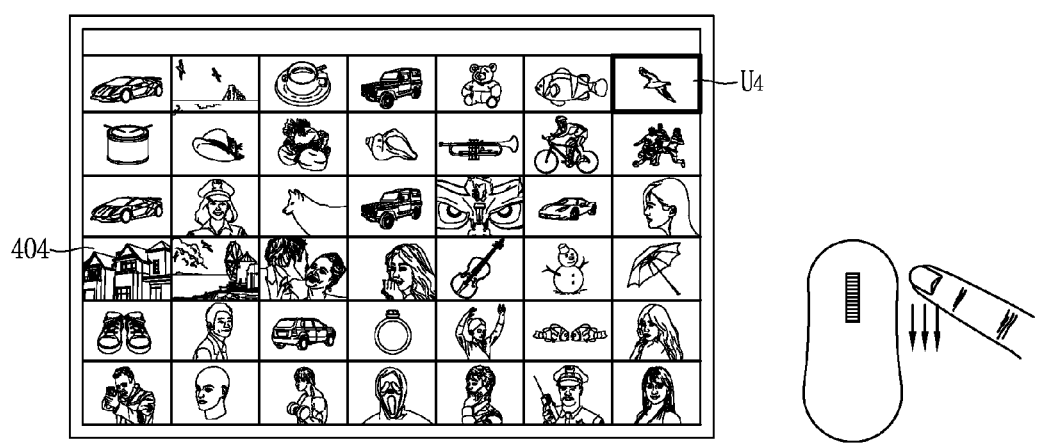
Figure 5C:
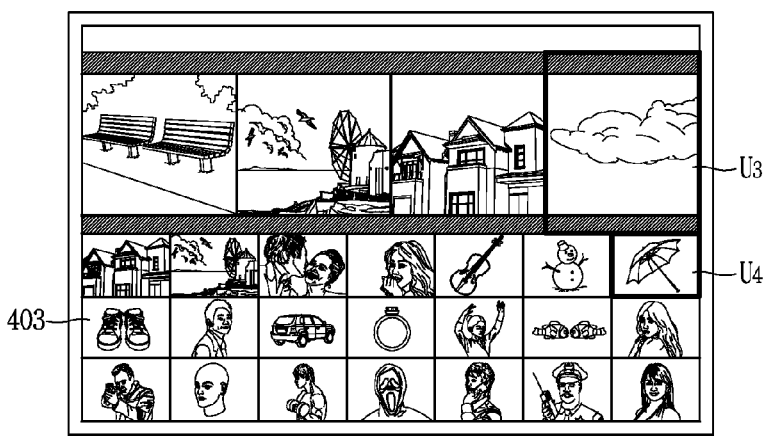

A control method to provide recommended content according to another embodiment will be explained with reference to FIGS. 5C(a) to 5C(c). FIG. 5C(a) illustrates the display unit 107 which outputs the first screen information 402 including a plurality of content displayed on the first and second units (U1 and U2).

When wireless signals corresponding to consecutive control commands are consecutively received, the controller 106 controls the display unit 107 to output the fourth screen information 404 composed of the fourth units (U4) for displaying a plurality of content. The fourth units (U4) are formed to have a smaller size than the first and second units (U1 and U2).

Referring to FIGS. 5C(b) and 5C(c), when wireless signals corresponding to a plurality of control commands applied to the remote controller 200 are consecutively received, the controller 106 extracts recommended content from a plurality of content.

The controller 106 controls the display unit 107 to output the third screen information 403 composed of the third and fourth units (U3 and U4) where a plurality of content is displayed, based on the wireless signal. Especially, the controller 106 controls the display unit 107 to display the recommended content on the third units (U3). The third units (U3) are preferably formed to have a larger size than the fourth units (U4).

That is, if wireless signals are consecutively received again in a state where a plurality of content has been output to units of a specific size, the controller 106 controls the display unit 107 to output recommended content to newly-formed units of a larger size. Thus, when a user has a difficulty in searching for his or her desired content after having been provided with a plurality of content, the user can apply a control command to the remote controller 200 to thus be provided with recommended content.

Figure 6A:
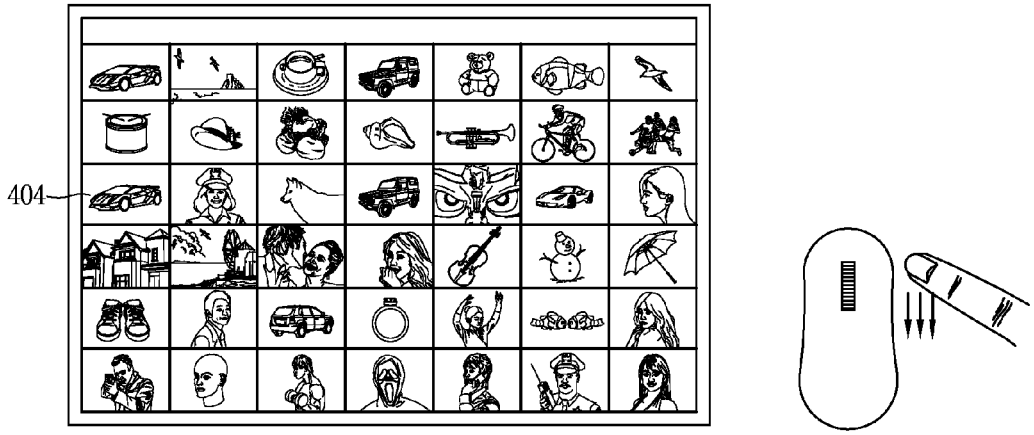
FIGS. 6(a) to 6(c) area conceptual view for explaining a control method to output recommended content based on a plurality of control commands.
Figure 6A:
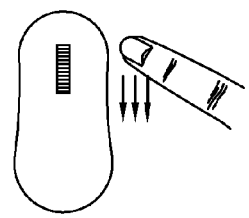
Figure 6B:
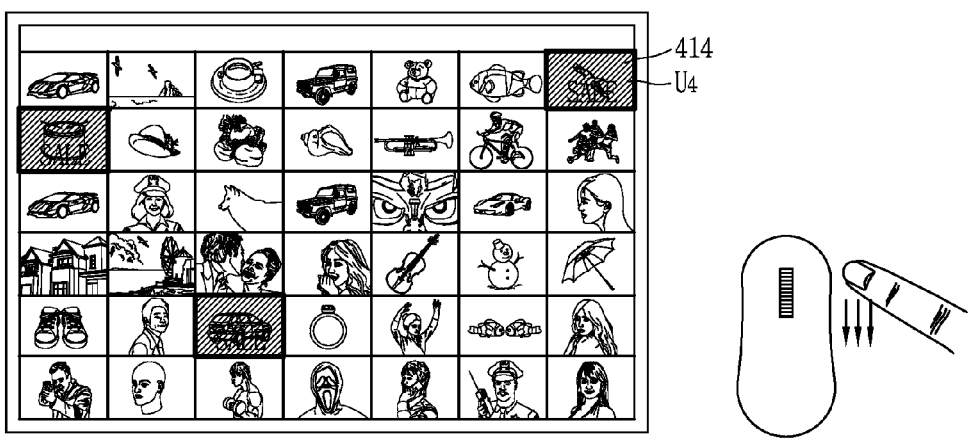
Figure 6B:
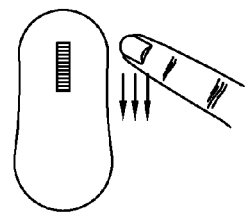
Figure 6C:
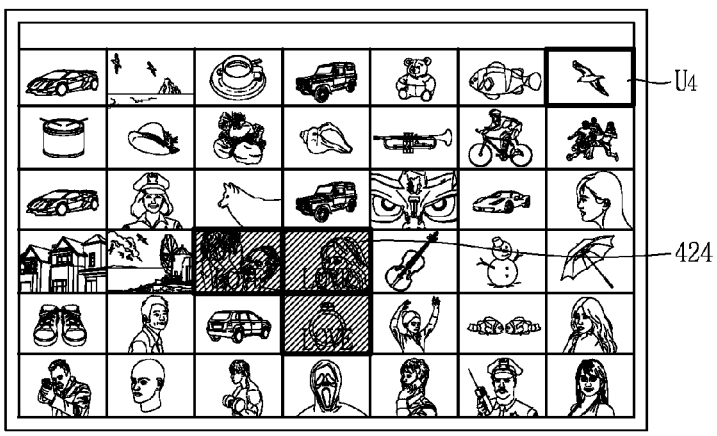

FIGS. 6(a) to 6(c) are conceptual views for explaining a control method to output recommended content based on a plurality of control commands.

FIG. 6(a) illustrates the display unit 107 which outputs fourth screen information 404 composed of a plurality of fourth units (U4) where a plurality of content is displayed. Upon reception of consecutive wireless signals corresponding to a plurality of control commands applied to the remote controller 200, the controller 106 extracts recommended content. The controller 106 may select recommended content from content output to the display unit 107.

The controller 106 selects recommended content according to a first basis, and outputs visual information to some of the plurality of fourth units (U4). For instance, the controller 106 may control a brightness of units where sale-related content 414 is displayed, or highlight the units. Alternatively, the controller 106 may control the display unit 107 to output characters 'SALE' regarding the first basis, to the content 414.

If wireless signals are consecutively received again, the controller 106 selects other recommended content according to a second basis different from the first basis. In this case, the controller 106 may select recommended content, among a plurality of content currently output to the display unit 107.

The controller 106 may output visual information to said other recommended content selected according to the second basis, or may control the display unit 107 to output characters 'LOVE' regarding the second basis. For instance, the second basis may correspond to a genre of content corresponding to a user's analyzed preference.

That is, while a user is being provided with a large amount of content at a time, the user may apply an additional control command to the remote controller 200 to thus be provided with recommended content according to various bases.

Figure 7A:
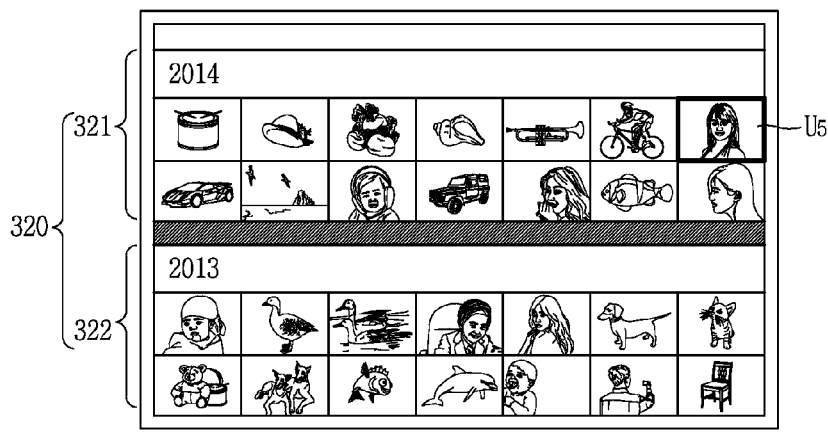
FIGS. 7A(a) to 7D(b) are conceptual views for explaining a control method to group content based on a control command.
Figure 7A:
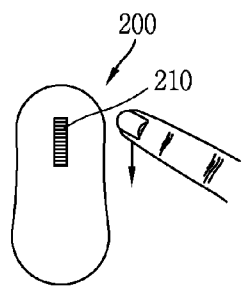
Figure 7A:
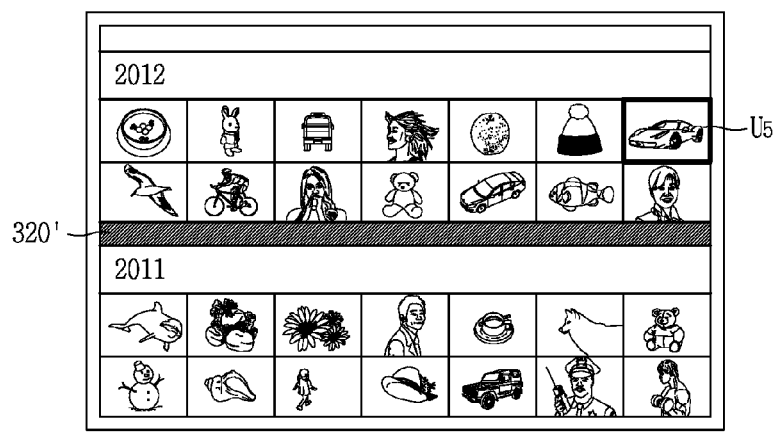
Figure 7A:
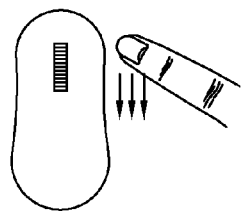
Figure 7A:
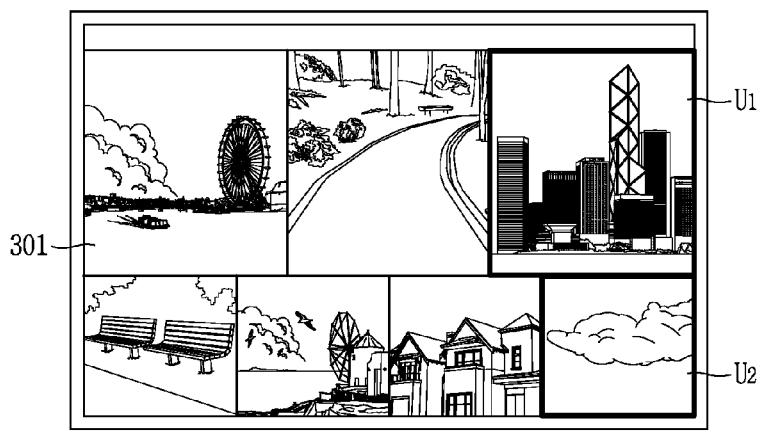

FIGS. 7A(a) to 7D(b) are conceptual views for explaining a control method to categorize content based on a control command.

FIG. 7A(a) illustrates the display unit 107 which outputs modified screen information 320' including content displayed on the fifth units (U5) by being categorized according to a first basis. The first basis corresponds to year. The third group 321 includes content related to year 2014, and the fourth group 322 includes content related to year 2013.

The controller 106 controls the display unit 107 to output an additional group 320' composed of content related to years 2012 and 2011 according to the first basis, based on a wireless signal corresponding to a control command applied to the remote controller 200. That is, the controller 106 may output additional groups arranged according to the first basis, based on a control command applied to the wheel key 210.

Referring to FIG. 7A(c), if wireless signals corresponding to a plurality of control commands applied to the remote controller 200 are consecutively received, the controller 106 controls the display unit 107 to output the initial screen information 301 composed of first and second units (U1 and U2). Content is output to the first and second units (U1 and U2). As the size of each unit is increased, the size of content to be output is increased.

For instance, if units where content is to be output have a minimized size, the controller 106 controls the display unit 107 to re-output the content to the initially-set units, based on consecutive wireless signals.

That is, a user can convert a current state of the display unit 107 into the initial output state, by continuously applying control commands to the remote controller 200.

A control method to change a categorization (grouping) basis will be explained with reference to FIGS. 7B(a) to 7B(c).

The controller 106 controls the display unit 107 to output the additional group 320', based on a wireless signal corresponding to a control command applied to the remote controller 200. Referring to FIGS. 4A(a) to 4A(c), the controller 106 outputs content by categorizing the content according to first and second bases, based on a plurality of control commands applied to the remote controller 200 so that the wheel key 210 can be rotated to a first direction.

Figure 7B:
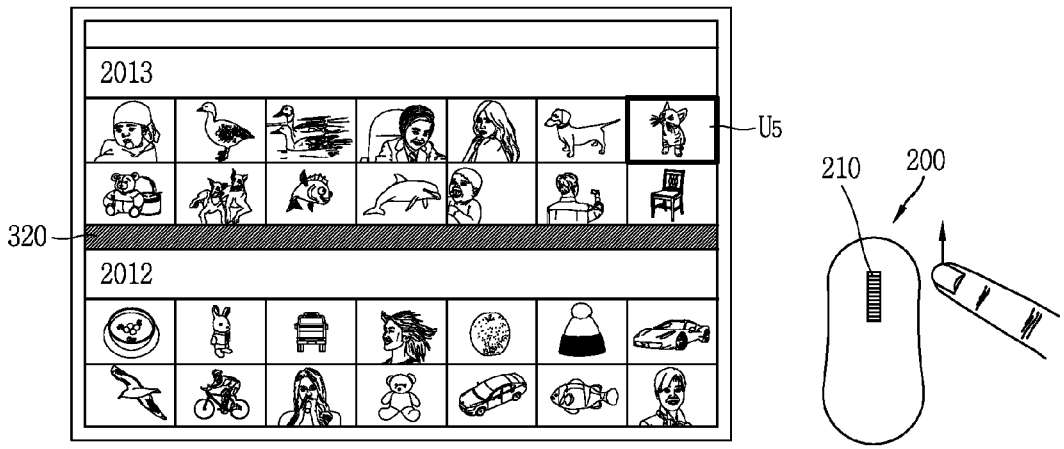
Figure 7B:
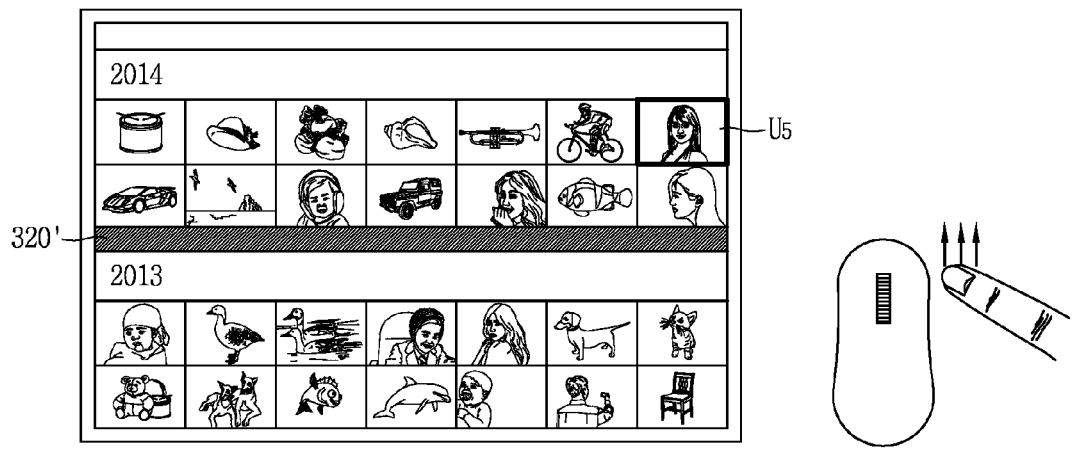
Figure 7B:
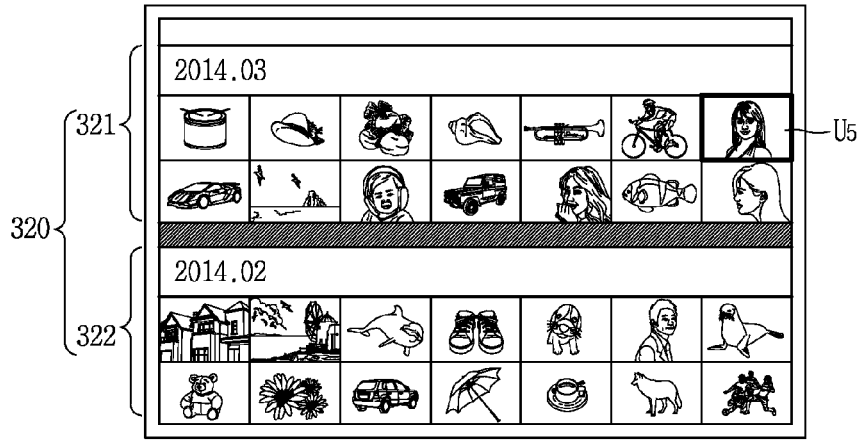

Referring to FIG. 7B(c), the controller 106 controls the display unit 107 to output the content by re-categorization according to another basis, based on a plurality of control commands applied to the remote controller 200 so that the wheel key 210 can be rotated to a second direction opposite to the first direction. For instance, while content categorized according to the second basis (year) is being output, if wireless signals corresponding to a plurality of control commands applied so that the wheel key 210 can be rotated to the second direction is received, the controller 106 controls the display unit 107 to output second screen information 320 including first and second groups 321 and 322 categorized according to the first basis (month).

Figure 7C:
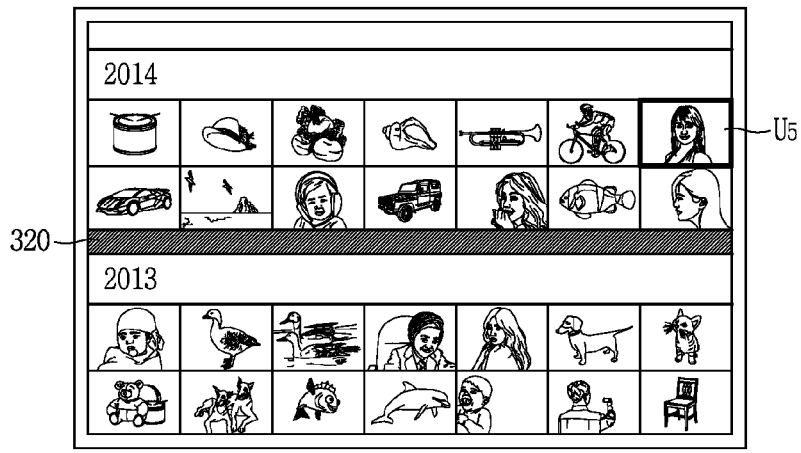
Figure 7C:
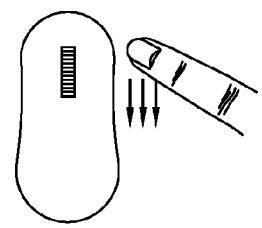
Figure 7C:
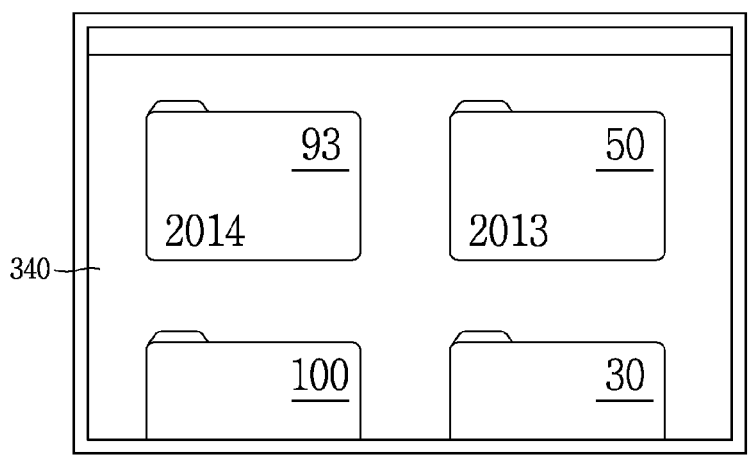
Figure 7C:
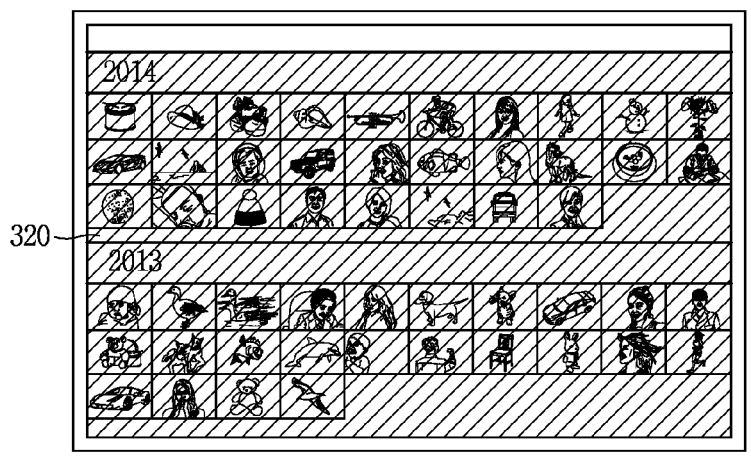

FIG. 7C(a) illustrates the display unit 107 which outputs the second screen information 320 including groups categorized according to the second basis (year). Content included the groups is displayed on the fifth units (U5).

Referring to FIGS. 7C(a) and 7C(b), if wireless signals corresponding to a plurality of control commands are consecutively received, the controller 106 controls the display unit 107 to output folder images 340 indicating a plurality of groups according to the second basis. Each of the folder images may include information on the second basis. Although not shown, if one of the folder images is selected by the remote controller 200, the controller 106 controls the display unit 107 to output content included in the folder images.

Referring to FIGS. 7C(a) and 7C(c), in a case where further categorization by the control command cannot be performed, or smaller units cannot be formed by the control command, the controller 106 controls the display unit 107 to output visual information indicating such state. For instance, if wireless signals corresponding to a plurality of control commands are consecutively received, the display unit 107 may output a twinkling visual effect in a state where the second screen information 320 has been output.

Figure 7D:
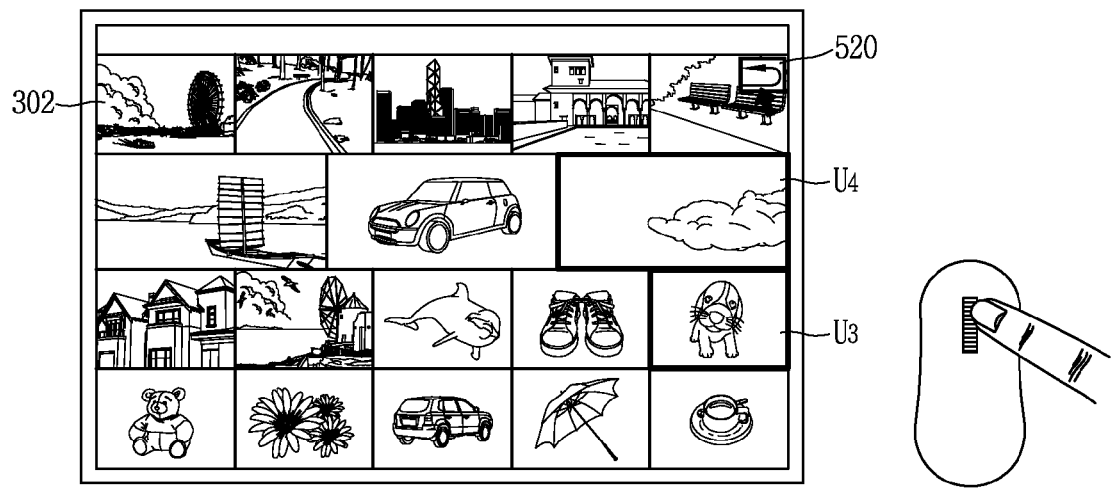
Figure 7D:
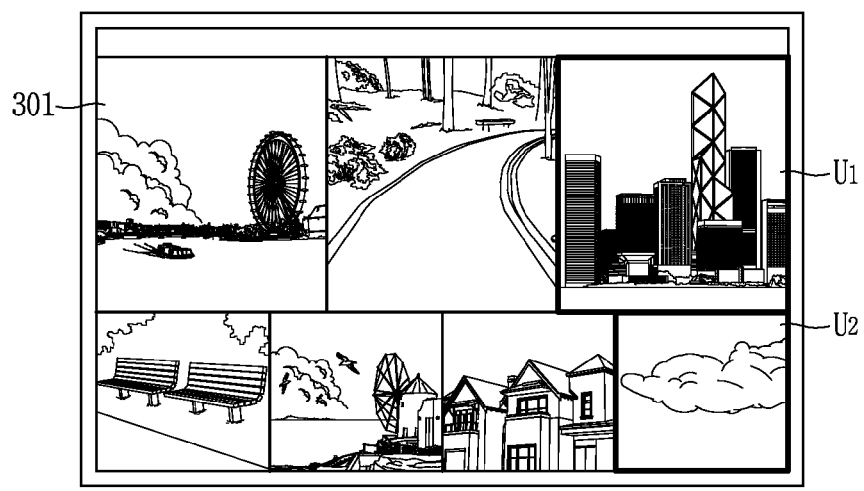

FIGS. 7D(a) and 7D(b) are conceptual views for explaining a control method to display an icon for re-changing a size of each unit and the number of units.

Referring to FIG. 7D(a), the display unit 107 outputs the modified screen information 302 composed of the third and fourth units (U3 and U4). Also, the controller 106 controls the display unit 107 to output an icon 520 for converting current information into the initial screen information 301, to the modified screen information 302.

The controller 106 controls the display unit 107 such that the modified screen information 302 is converted into the initial screen information 301 based on a control command applied to the icon 520. In this case, the initial screen information 301 may include content which has been output at a time point when a plurality of control commands for outputting the modified screen information 302 are generated. Alternatively, the initial screen information 301 may correspond to screen information for displaying some of currently-output content on the first and second units (U1 and U2).

The controller 106 may control the display unit 107 to be converted into a right previous state, or to output the initial screen information 301, based on a user's setting.

The control command applied to the icon 520 may be generated by the user input unit.

Thus, a user can easily convert an output method of a plurality of content while being provided with the plurality of content at a time.

Figure 8A:
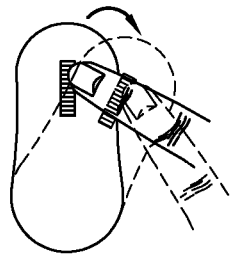
FIGS. 8A to 8C(b) are conceptual views for explaining a control method to output content based on different control commands applied to a remote controller.
Figure 8B:
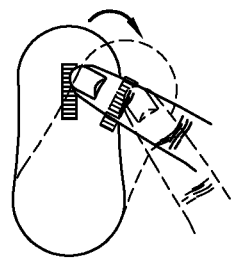
Figure 8C:
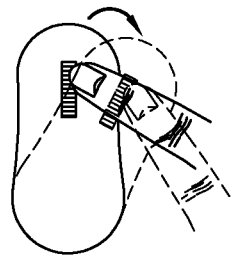

FIGS. 8A to 8C(b) are conceptual views for explaining a control method to output content based on control commands applied to the remote controller.

Referring to FIGS. 8A and 8B, a control method to output content categorized by different bases. Referring to FIG. 8A, in a state where content of groups categorized according to the second basis (month) has been output, if a gesture command is applied from the remote controller 200, the controller 106 controls the display unit 107 to output content of groups categorized according to a fourth basis.

Referring to FIG. 8B, in a state where content of groups categorized according to the first basis (year) has been output, if a gesture command is generated by the remote controller 200, the controller 106 controls the display unit 107 to output content of groups categorized according to a third basis (nation).

The gesture command is formed when a motion of the remote controller is sensed by the sensor. For instance, if a user's motion to the right side is sensed by the sensor, the controller 106 controls the display unit 107 to output new screen information by moving the screen information to the left side. Although not shown, in a case where the remote controller is moved to the left side, the controller 106 may control the display unit 107 to re-output groups categorized according to the first basis, by sensing the motion of the remote controller.

That is, the first and second bases may correspond to the third and fourth bases. If a wireless signal corresponding to a gesture command applied in a state where the categorized groups have been output is received, the controller 106 may control the display unit 107 to output each group categorized according to a corresponding basis.

A wireless signal for changing the basis is not limited to the gesture command. For instance, the controller 106 may control the display unit 107 based on control commands applied to a plurality of buttons of the remote controller 200.

A control method to output additional content included in each group will be explained with reference to FIGS. 8C(a) and 8C(b). If wireless signals are consecutively received, the controller 106 controls the display unit 107 to output content by categorizing the content according to the first basis. The display unit 107 may not output all of content included in a single group based on a size of each unit for displaying the content. Thus, the display unit 107 preferentially outputs some content included in the group.

If a wireless signal corresponding to a gesture command applied to the remote controller 200 is received, the controller 106 controls the display unit 107 to output the rest content included in each group.

So far, a method of controlling screen information based on a control command to rotate the wheel key 210 has been explained. However, the method of forming a control command and forming a wireless signal may be implemented in various manners.

Figure 9A:
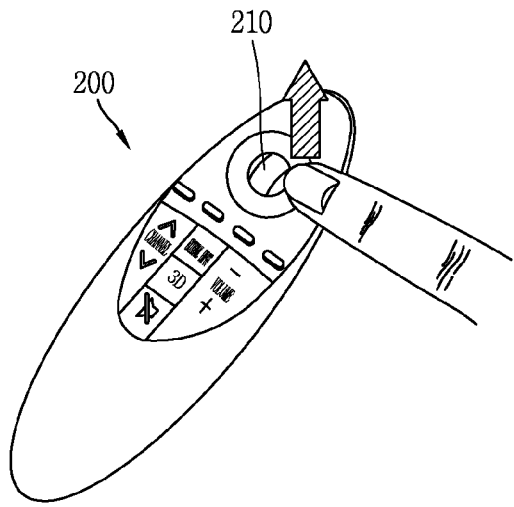
FIGS. 9(a) to 9(c) are a conceptual view for explaining a control method to form a control command by a remote controller, according to various embodiments.
Figure 9B:
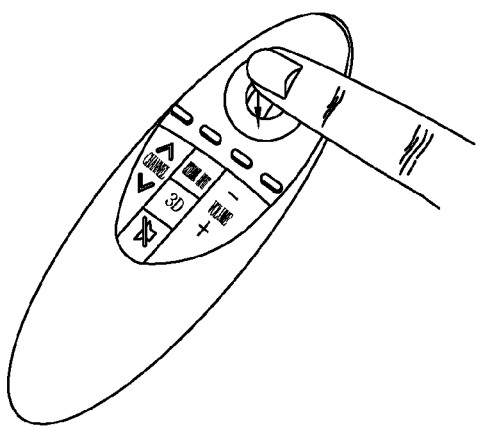
Figure 9C:
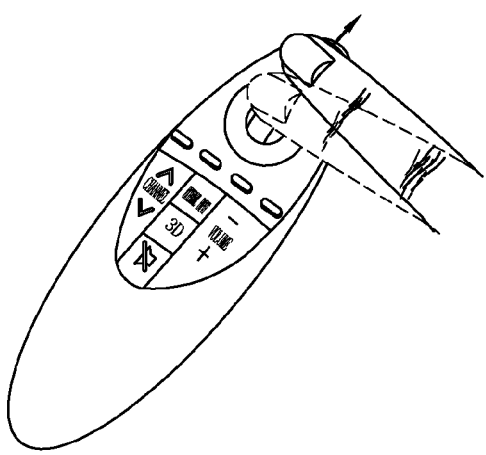

FIGS. 9(a) to 9(c) are conceptual views for explaining a control method to form a control command by a remote controller, according to various embodiments.

Referring to FIG. 9(a), a plurality of control commands may be generated by a physical force to tilt the wheel key 210. The wheel key may be configured to distinguish a user's rotating force and tilting force from each other. The wheel key may be rotated within different ranges according to an external force applied thereto. The controller 106 may determine a frequency (the number of times) of control commands, based on a rotation degree of the wheel key, the rotation degree resulting from an external force applied by a user.

Although not shown, a rotation degree of the wheel key 210, which corresponds to a single control command, may be set.

Referring to FIG. 9(b), consecutive control commands may be implemented by a long-push input applied to the wheel key 210 for more than a preset time. That is, the remote controller may transmit consecutive wireless signals, if the wheel key 210 is pressed for more than a preset time.

Referring to FIG. 9(c), consecutive control commands may be implemented by rotation of the wheel key 210 by an external force after a long-push input has been applied to the wheel key 210 for more than a preset time. That is, in a state where some of sequentially-arranged content has been output, if the wheel key 210 of the remote controller 200 is rotated, the controller 106 transmits a wireless signal for outputting the rest content. If the wheel key 210 is rotated after a long-push input has been applied thereto, the controller 106 changes units for outputting the content, or transmits a wireless signal for categorizing the content.

Figure 10A:
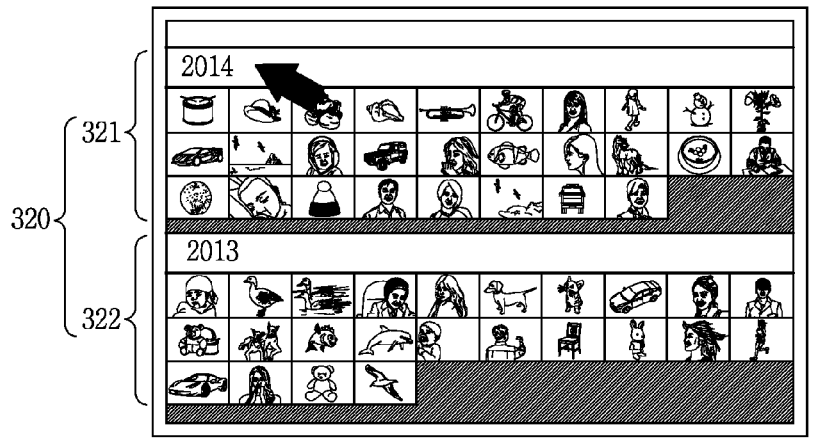
FIGS. 10A(a) to 10B(b) are conceptual view for explaining a control method to output a plurality of content when the content is selected by a cursor.
Figure 10A:
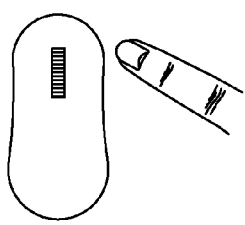
Figure 10A:
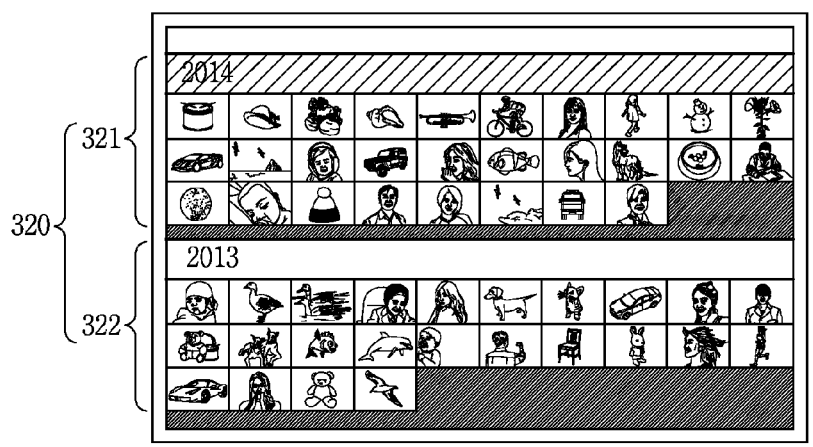
Figure 10A:
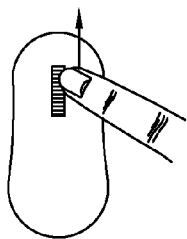
Figure 10A:
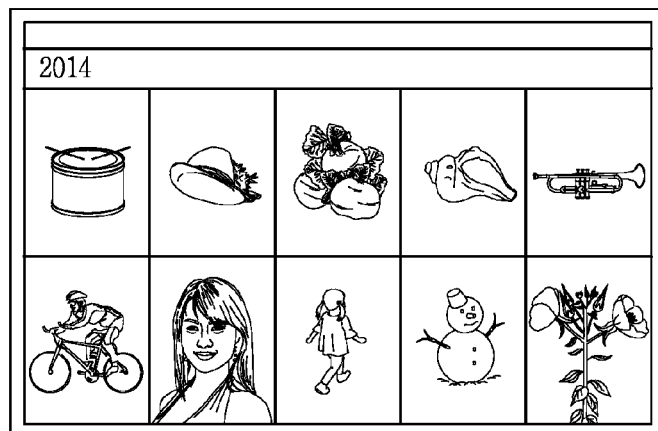

FIGS. 10A(a) to 10B(b) are conceptual views for explaining a control method for outputting a plurality of content when the content is selected by a cursor.

Referring to FIGS. 10A(a) to 10A(c), the display unit 107 may output the second screen information 320 including the third and fourth groups 321 and 322. The controller 106 may select a single content or a single group using the remote controller 200. The controller 106 controls the display unit 107 to output a cursor by the remote controller 200.

Referring to FIGS. 10A(b) and 10A(c), in a state where said one group has been selected, if wireless signals corresponding to a plurality of control commands applied to the remote controller 200 are consecutively received, the controller 106 controls the display unit 107 to output content of the selected group in an enlarged manner.

For instance, the controller 106 may control the display unit 107 to output each content included in the selected group, by generating large-sized units based on the consecutive wireless signals.

In a case where a plurality of content is displayed on small-sized units, the controller 106 may control the display unit 107 to select a single unit, and to output at least a single content in an enlarged manner based on the selected unit.

Figure 10B:
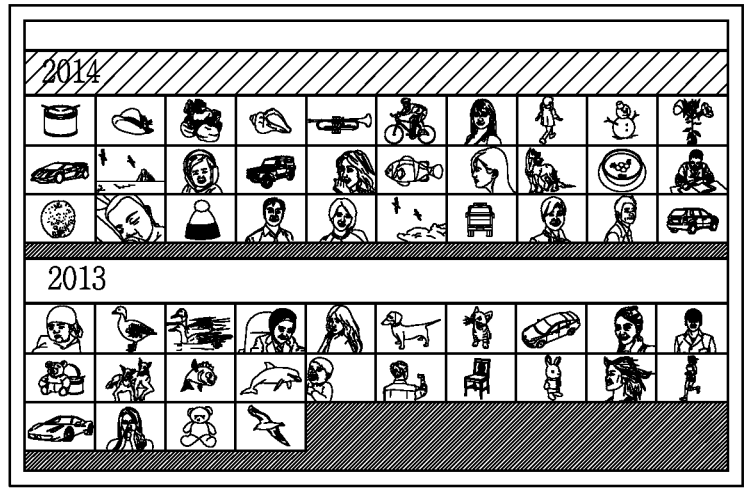
Figure 10B:
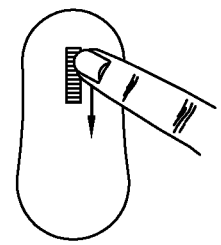
Figure 10B:
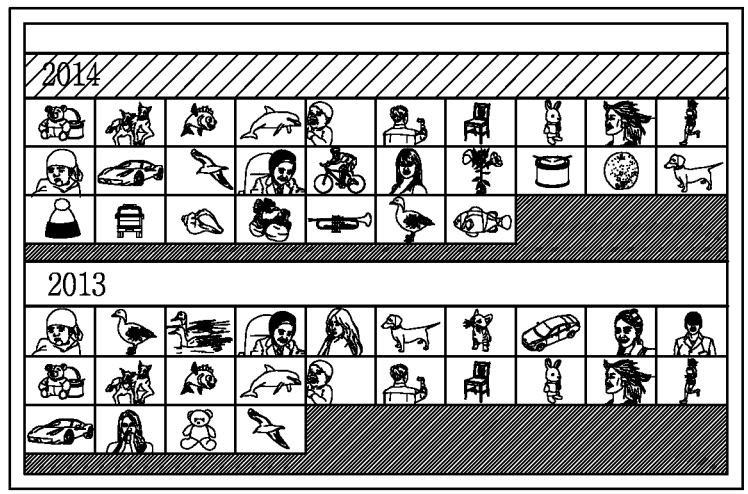

Referring to FIGS. 10B(a) and 10B(b), a control method to output the rest content will be explained.

Based on a control command applied such that the wheel key 210 of the remote controller 200 is rotated to the first direction, the display unit 107 outputs content categorized according to a second basis. After a single group has been selected by the remote controller 200, the controller 106 may control the display unit 107 to output the rest content of the selected group, based on a control command applied such that the wheel key 210 of the remote controller 200 is rotated to the first direction.

That is, a user can output content by categorizing the content based on a plurality of control commands. Further, when a single group is selected, the user can be provided with the rest content based on a control command.

Figure 11A:
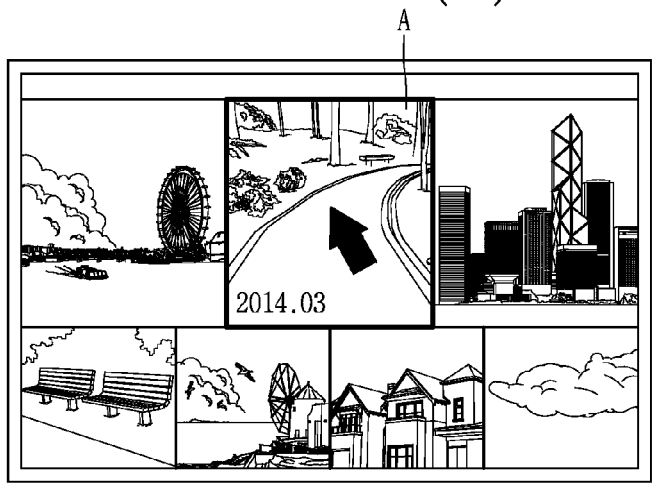
FIGS. 11A(a) to 11B(d) are conceptual views for explaining a control method in a case where a control command is applied to a remote controller in a state where a single content has been selected.
Figure 11A:
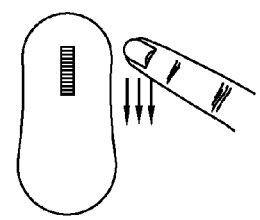
Figure 11A:
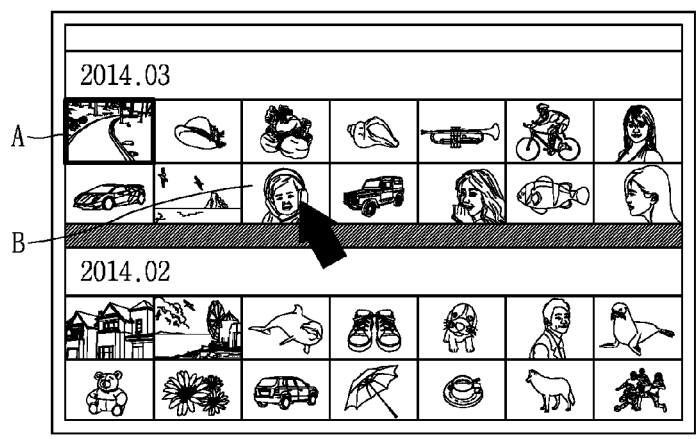
Figure 11A:
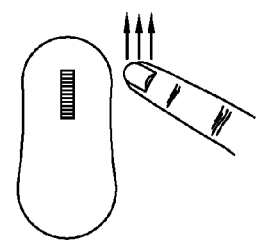
Figure 11A:
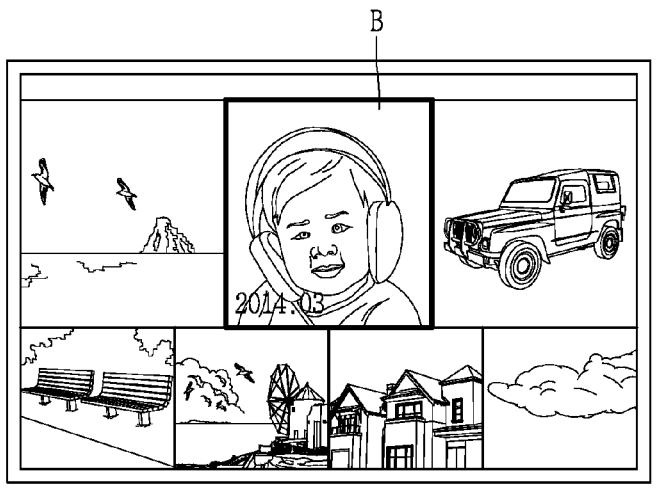

FIGS. 11A(a) to 11B(d) are conceptual views for explaining a control method in a case where a control command is applied to the remote controller 200 in a state where a single content has been selected.

Referring to FIGS. 11A(a) to 11A(c), the controller 106 may select a single content based on a preset control command applied to the remote controller 200. Referring to FIGS. 11A(a) and 11A(b), if a control command is applied in a state where first content (A) has been selected, the controller 106 controls the display unit 107 to output content by categorization. The categorized group includes the selected first content (A). The control command for categorizing the content is generated as the wheel key 210 is rotated to a first direction a plurality of times.

The controller 106 may select second content (B) based on a control command applied to the remote controller 200, while the categorized content is being output. In a state where the second content (B) has been selected, the controller 106 controls the display unit 107 to enlarge content based on the second content (B), based on a wireless signal corresponding to a control command applied such that the wheel key is rotated to a second direction opposite to the first direction. That is, if a control command is applied after content has been selected, the controller 106 controls the display unit 107 to group content based on the selected content, or to output content after changing a size of the content.

Figure 11B:
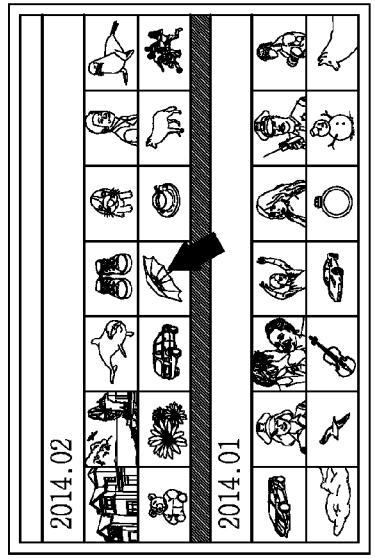
Figure 11B:
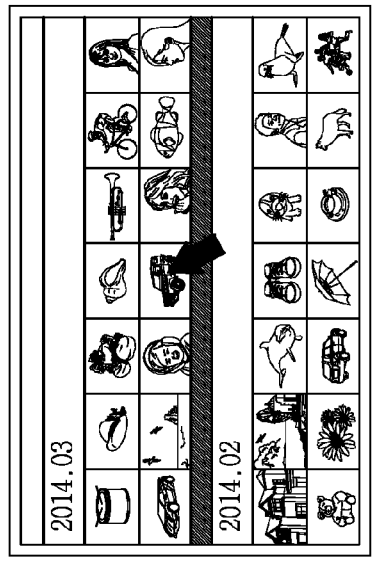
Figure 11B:
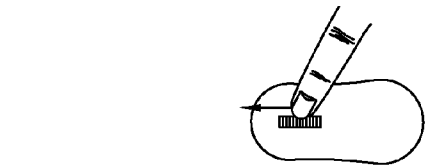
Figure 11B:
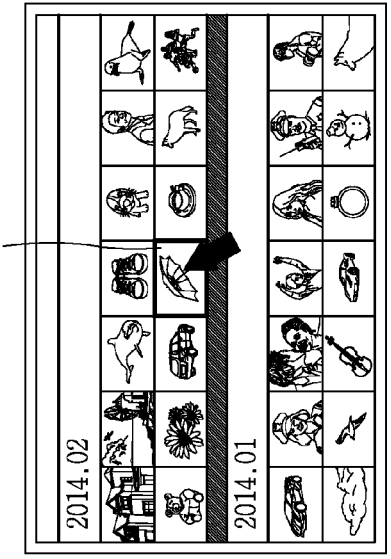
Figure 11B:
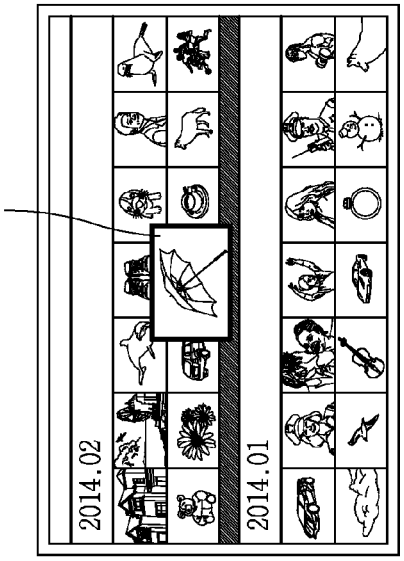

FIGS. 11B(a) to 11B(d) are conceptual views for explaining a control method to output content according to whether content has been selected or not. Referring to FIGS. 11B(a) and 11B(b), the controller 106 controls the display unit 107 to output additional content included in a group, based on a control command applied to the wheel key 210.

Referring to FIGS. 11B(b) and 11B(c), the controller 106 selects third content (C) based on a control command applied to the remote controller 200. The controller 106 controls the display unit 107 to output enlarged third content (C'), based on a control command applied to the wheel key 210 in a state where the third content (C) has been selected.

That is, the controller 106 may control the display unit 107 in a different manner, based on the same control command applied to the wheel key 210, according to whether content has been selected or not, in a state where a plurality of content has been output.

Figure 12A:
FIGS. 12(a) to 12(c) are a conceptual view for explaining a control method to output an output list window for selecting an output method of content.
Figure 12B:
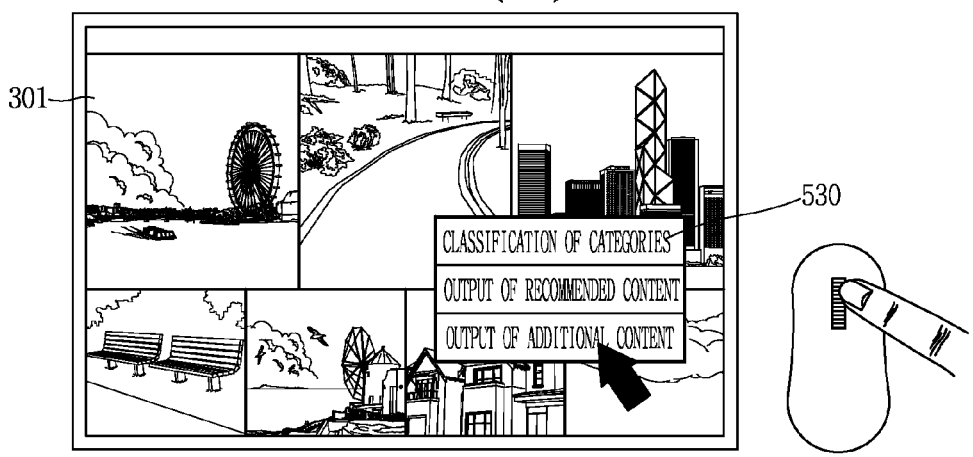
Figure 12C:
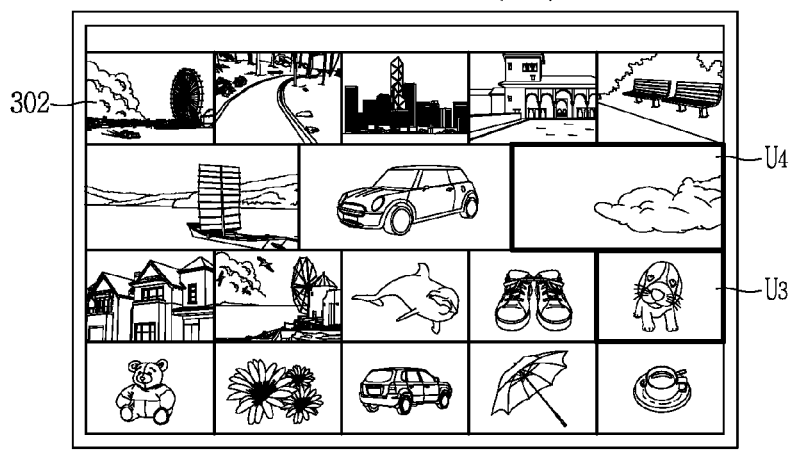

FIGS. 12(a) to 12(c) is a conceptual view for explaining a control method to output an output list window for selecting an output method of content.

When wireless signals are consecutively received in a state where the initial screen information 301 composed of a plurality of content displayed on the first and second units (U1 and U2), the controller 106 controls the display unit 107 to output an output list window 530. The output list window 530 may be output on the initial screen information 301 in an overlapped manner.

For instance, the output list window 530 may include classification of categories for displaying content by classifying categories of the content from each other, output of recommended content for outputting recommended content by extracting among a plurality of content, output of additional content for outputting a larger number of content at a time, etc.

The controller 106 may output the content based on a user's control command included in the list.

FIGS. 13A(a) to 13B are conceptual views for explaining change of a control command by setting.

Referring to FIG. 13A(a), if a wireless signal corresponding to a single control command is transmitted, the controller 160 controls the display unit 107 to output additional screen information 301'. The single control command may be generated when the wheel key 210 has been rotated by a preset angle.

If wireless signals corresponding to a plurality of control commands are consecutively transmitted within a preset time, the controller 106 controls the display unit 107 to output the modified screen information 302 composed of the third and fourth units (U3 and U4).

Referring to FIG. 13A(b), if a wireless signal corresponding to a control command generated by rapidly rotating the wheel key 210 at a speed more than a preset value, the controller 106 controls the display unit 107 to output the modified screen information 302. That is, the control command to output the modified screen information is based on a rotation speed of the wheel key 210.

The controller 106 may set at least one of the number of times that the wheel key 210 is rotated, and a rotation speed of the wheel key 210, as a control command. That is, if a user rapidly applies an input or applies a plurality of inputs, a plurality of content is provided. Thus, the user can easily search for his or her desired information.

FIG. 13B is a conceptual view for explaining a setting screen for setting control of screen information by rotation of the wheel key 210.

A user may set whether to change layout of content according to a scroll input of the wheel key 210. That is, the user may set a size of each unit and the number of units, to be changed.

Further, the user may select the number of times of scrolls, or the degree of scroll, as a control command for changing the layout, and may set a maximum number (a minimum number, a size or the like) of units included in the layout.

Besides, the user may set whether to output content by classifying categories (or whether to provide recommended content (although not shown)), based on a control command.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 106 of the display apparatus.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display apparatus, comprising:
a display configured to display a preset number of units divided from each other, such that some of a plurality of contents are output to the preset number of units;
a remote controller configured to receive a control command;
a wireless communication module configured to transmit a scroll input corresponding to the control command to the display; and
a controller configured to:
control the display to sequentially output additional contents arranged after currently-output contents among sequentially-arranged contents based on the scroll input scrolling at a speed less than a preset value, and
change a size of each unit and the number of units based on the scroll input scrolling at a speed more than the preset value,
wherein the changed units comprise:
first units corresponding to the currently-output contents that are displayed on the display before the scroll input scrolling at the speed more than the preset value, and
second units corresponding to the additional contents that are displayed based on the scroll input scrolling at the speed more than the preset value, and
wherein a size of each of the second units is different from a size of each of the first units for distinguishing the currently-output contents from the additional contents.

2. The display apparatus of claim 1, wherein the remote controller is provided with a sensor configured to sense a motion of the remote controller, and
wherein the controller controls the display such that the content is re-output to the preset number of units, based on a gesture command generated by the motion.

3. The display apparatus of claim 2, wherein the remote controller includes a wheel key formed to be rotatable, and wherein the control command is generated as the wheel key is rotated.

4. The display apparatus of claim 3, wherein in a case where the size of each unit has been reduced based on a control command to rotate the wheel key to a first direction, based on a plurality of wireless signals corresponding to a plurality of control commands to rotate the wheel key to a second direction opposite to the first direction, the controller restores the size of each unit and the number of units.

5. The display apparatus of claim 1, wherein the controller controls the display to categorize the content into groups according to a preset first basis, based on a plurality of wireless signals, and to output at least one of the groups in a distinguished manner, and
wherein the plurality of wireless signals correspond to the scroll input scrolling at the speed more than the preset value.

6. The display apparatus of claim 5, wherein in a case where consecutive wireless signals are additionally received, the controller controls the display to re-categorize the content into groups according to a second basis different from the first basis, and to output at least one of the re-categorized groups in a distinguished manner.

7. The display apparatus of claim 6, wherein the first basis is determined by information on the content, and corresponds to at least one of a stored date, a received date, a content type and a content genre.

8. The display apparatus of claim 7, wherein the remote controller is provided with a sensor configured to sense a motion of the remote controller,
wherein when the content is categorized according to the first basis, the controller re-categorizes the content based on the motion according to a third basis corresponding to the first basis,
wherein when the content is categorized according to the second basis, the controller re-categorizes the content based on the motion according to a fourth basis corresponding to the second basis, and
wherein when the second basis is lower than the first basis, the fourth basis is lower than the third basis.

9. The display apparatus of claim 6, wherein in a case where the content is re-categorized according to the second basis, the controller controls the display to output the content by further reducing the size of each unit.

10. The display apparatus of claim 5, wherein when a wireless signal corresponding to the control command is applied from the remote controller while some of a plurality of groups are being output to the display, the controller controls the display to output the other groups among the plurality of groups.

11. The display apparatus of claim 10, wherein when a wireless signal corresponding to the control command is applied from the remote controller, in a case where one of the plurality of groups has been selected, the controller controls the display to output the other content included in the selected group.

12. The display apparatus of claim 5, wherein the remote controller is provided with a sensor configured to sense a motion of the remote controller, and
wherein the controller controls the display to output the other content included in each group based on the motion.

13. The display apparatus of claim 1, wherein when wireless signals are consecutively received, the controller extracts recommended content from the plurality of contents according to a preset basis, and
wherein the controller controls the display to output the recommended content.

14. The display apparatus of claim 13, wherein the controller outputs the recommended content to recommended units of a preset size, and
wherein a size of the recommended units is larger than the size of the decreased units.

15. The display apparatus of claim 14, wherein the controller controls the display to output recommended information to the recommended units.

16. The display apparatus of claim 1, wherein the size of each unit is different from each other.

17. The display apparatus of claim 1, wherein in a case where wireless signals are received a preset number of times within a preset reference time, the controller changes the size of each unit and the number of units.

18. A method of controlling a display apparatus, the method comprising:
displaying some of a plurality of sequentially-arranged contents on a preset number of units divided from each other on a display;
receiving a control command by a remote controller;
transmitting a scroll input corresponding to the control command to the display;
controlling the display to sequentially output additional contents arranged after currently-output contents among sequentially-arranged contents based on the scroll input scrolling at a speed less than a preset value; and
changing a size of each unit and the number of units based on the scroll input scrolling at a speed more than the preset value,
wherein the changing the size of each unit and the number of units comprises:
generating first units corresponding to the currently-output contents that are displayed on the display before the scroll input scrolling at the speed more than the preset value, and
generating second units corresponding to the additional contents that are displayed based on the scroll input scrolling at the speed more than the preset value, and
wherein a size of each of the second units is different from a size of each of the first units for distinguishing the currently-output contents from the additional contents.

19. The method of claim 18, further comprising extracting recommended content from the plurality of sequentially-arranged contents, according to a preset basis, in a case where a plurality of wireless signals are consecutively received, and
wherein the plurality of wireless signals correspond to the scroll input scrolling at the speed more than the preset value.

20. The method of claim 18, further comprising categorizing the plurality of sequentially-arranged contents according to a preset basis, in a case where a plurality of wireless signals are consecutively received.

* * * * *